United States Patent
Xie et al.

(10) Patent No.: US 11,625,870 B2
(45) Date of Patent: Apr. 11, 2023

(54) METHOD OF CONSTRUCTING A MODEL OF THE MOTION OF A MOBILE DEVICE AND RELATED SYSTEMS

(71) Applicant: Oxford University Innovation Limited, Oxford (GB)

(72) Inventors: Linhai Xie, Oxford (GB); Sen Wang, Oxford (GB); Andrew Markham, Oxford (GB); Niki Trigoni, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 187 days.

(21) Appl. No.: 16/635,189

(22) PCT Filed: Jul. 31, 2018

(86) PCT No.: PCT/GB2018/052188
§ 371 (c)(1),
(2) Date: Jan. 30, 2020

(87) PCT Pub. No.: WO2019/025788
PCT Pub. Date: Feb. 7, 2019

(65) Prior Publication Data
US 2021/0097739 A1    Apr. 1, 2021

(30) Foreign Application Priority Data

Jul. 31, 2017 (GR) ............................... 20170100360
Nov. 9, 2017 (GB) ..................................... 1718507

(51) Int. Cl.
*G06T 11/20* (2006.01)
*H04W 4/029* (2018.01)
*G01C 22/02* (2006.01)

(52) U.S. Cl.
CPC ............ *G06T 11/206* (2013.01); *G01C 22/02* (2013.01); *H04W 4/029* (2018.02)

(58) Field of Classification Search
CPC ...... G06T 11/206; G06T 11/20; G06F 3/0481; G06F 17/246; H04L 41/22
(Continued)

(56) References Cited

U.S. PATENT DOCUMENTS 8,787,614 B2    7/2014  Choi et al.
9,104,206 B2    8/2015  Biber et al.
(Continued)

FOREIGN PATENT DOCUMENTS

CN    102831446 A    12/2012
CN    103901774 A    7/2014
(Continued)

OTHER PUBLICATIONS

Yasir Latif, Cecar Cadena, and Jose Neira, Robust Loop Closing Over Time, Jul. 2012 (Year: 2012).*
(Continued)

*Primary Examiner* — Gordon G Liu
(74) *Attorney, Agent, or Firm* — Thomas|Horstemeyer, LLP

(57) ABSTRACT

A computer-implemented method 1000 of constructing a model of the motion of a mobile device, wherein the method comprises using a sensor of the device to obtain 1002 positional data providing an estimated pose of the mobile device, generating an initial graph 1004 based upon the positional data from the sensor, nodes of which graph provide a series of possible poses of the device, and edges of which graph represent odometry and/or loop closure constraints; processing the graph to estimate 1006 confidence scores for each loop closure by performing pairwise consistency tests between each loop closure and a set of
(Continued)

other loop closures; and generating an augmented graph from the initial graph by retaining or deleting 1008 each loop closure based upon the confidence scores.

19 Claims, 11 Drawing Sheets

(58) Field of Classification Search
USPC .......................................................... 345/440
See application file for complete search history.

(56) References Cited

U.S. PATENT DOCUMENTS

| | | | |
|---|---|---|---|
| 9,224,043 B2 | 12/2015 | Hasegawa et al. | |
| 9,288,632 B2 | 3/2016 | Yang et al. | |
| 9,288,633 B2 | 3/2016 | Yang et al. | |
| 9,612,123 B1 | 4/2017 | Levinson et al. | |
| 10,281,282 B2 | 5/2019 | Trigoni et al. | |
| 10,502,576 B2 | 12/2019 | Trigoni et al. | |
| 2011/0082585 A1 | 4/2011 | Sofman et al. | |
| 2012/0121161 A1* | 5/2012 | Eade | G05D 1/0253 382/153 |
| 2012/0306847 A1 | 12/2012 | Lim et al. | |
| 2014/0376777 A1 | 12/2014 | Churchill et al. | |
| 2015/0332489 A1* | 11/2015 | Birchfield | G06T 7/70 345/440 |
| 2016/0071278 A1 | 3/2016 | Leonard et al. | |
| 2017/0046868 A1 | 2/2017 | Chernov et al. | |

FOREIGN PATENT DOCUMENTS

| | | |
|---|---|---|
| CN | 104850615 A | 8/2015 |
| CN | 105856230 A | 8/2016 |
| EP | 2 380 135 B1 | 2/2015 |
| WO | 2014/198489 A1 | 12/2014 |

OTHER PUBLICATIONS

International Search Report and Written Opinion for PCT/GB2018/052188, dated Oct. 31, 2018, pp. 1-10.
Yasir Latif et al: "Robust Loop Closing Over Time", Robotics: Science and Systems VIII, Jul. 9, 2012 (Jul. 9, 2012).
Xie Linhai et al: "GraphTinker: Outlier rejection and inlier injection for pose graph SLAM", 2017 IEEE/RSJ International Conference on Intelligent Robots and Systems (IROS), IEEE, Sep. 24, 2017 (Sep. 24, 2017), pp. 6777-6784.
UK Search Report for GB 1718507.5, dated May 9, 2018, pp. 1-4.
N. Silnderhauf and P. Protzel, "Towards a robust back-end for pose graph slam," in ICRA. IEEE, 2012, pp. 1254-1261.
N. Sunderhauf and P. Protzel, "Switchable constraints for robust pose graph slam," in IROS. IEEE, 2012, pp. 1879-1884.
P. Agarwal, G. D. Tipaldi, L. Spinello, C. Stachniss, and W. Burgard, "Robust map optimization using dynamic covariance scaling," in ICRA. IEEE, 2013, pp. 62-69.
Y. Latif, C. Cadena, and J. Neira, "Robust loop closing overtime," in Proc. Robotics: Science Systems, 2013, pp. 233-240.
E. Olson and P. Agarwal, "Inference on networks of mixtures for robust robot mapping," The International Journal of Robotics Research, vol. 32, No. 7, pp. 826-840, 2013.
E. Olson, "Inference on networks of mixtures for robust robot mapping," Robotics: Science and Systems VIII, p. 313, 2013.
G. H. Lee, F. Fraundorfer, and M. Pollefeys, "Robust pose-graph loop-closures with expectation-maximization," in IROS. IEEE, 2013, pp. 556-563.
Y. Latif, C. Cadena, and J. Neira, "Robust loop closing over time for pose graph slam," The International Journal of Robotics Research, pp. 1611-1626, 2013.
L. Carlone, A. Censi, and F. Dellaert, "Selecting good measurements via 1-1 relaxation: A convex approach for robust estimation over graphs," in IROS. IEEE, 2014, pp. 2667-2674.
M. C. Graham, J. P. How, and D. E. Gustafson, "Robust incremental slam with consistency-checking," in IROS. IEEE, 2015, pp. 117-124.
A. V. Segal and I. D. Reid, "Hybrid inference optimization for robust pose graph estimation," in IROS. IEEE, 2014, pp. 2675-2682.
D. Fourie, J. Leonard, and M. Kaess, "A nonparametric belief solution to the bayes tree," in IROS. IEEE, 2016, pp. 2189-2196.
R. Kummerle, G. Grisetti, H. Strasdat, K. Konolige, and W. Burgard, "g 2 o: A general framework for graph optimization," in ICRA. IEEE, 2011, pp. 3607-3613.
G. Grisetti, R. Kummerle, C. Stachniss, and W. Burgard, "A tutorial on graph-based slam," IEEE Intelligent Transportation Systems Magazine, vol. 2, No. 4, pp. 31-43, 2010.
M. Mazuran, G. D. Tipaldi, L. Spinello, W. Burgard, and C. Stachniss, "A statistical measure for map consistency in slam," in ICRA. IEEE, 2014, pp. 3650-3655.
M. Muller, "Dynamic time warping," Information retrieval for music and motion, pp. 69-84, 2007.
P. Agarwal, "Robust graph-based localization and mapping," Ph.D. dissertation, PhD thesis, University of Freiburg, Germany, 2015.
S. Wang, H. Wen, R. Clark, and N. Trigoni, "Keyframe based large-scale indoor localisation using geomagnetic field and motion pattern," in IROS, 2016.
R. Clark, S. Wang, N. T. Andrew Markham, and H. Wen, "Vidloc: A deep spatio-temporal model for 6-dof video-clip relocalization," in CVPR, 2017.

* cited by examiner

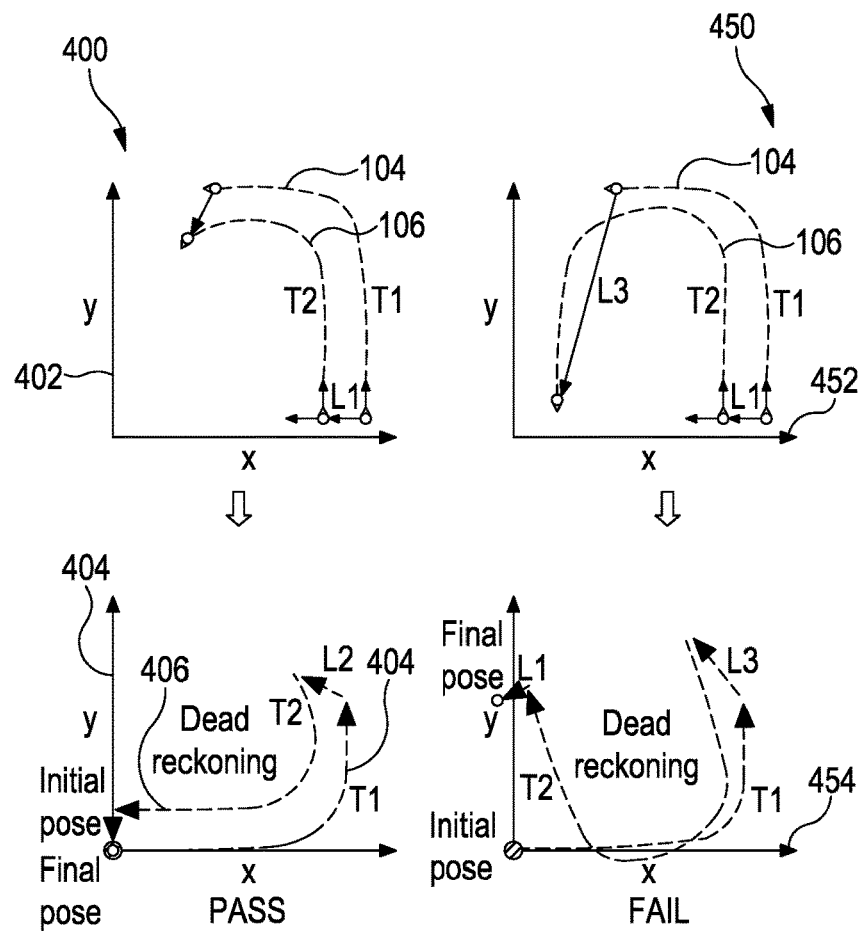
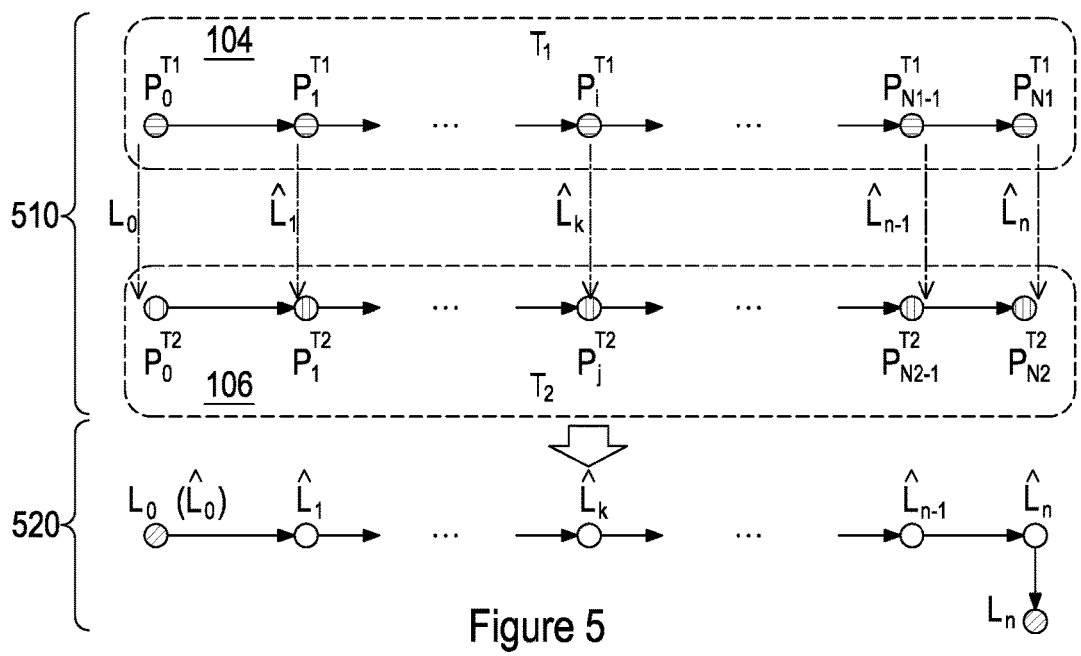
Figure 4
Figure 5

METHOD OF CONSTRUCTING A MODEL OF THE MOTION OF A MOBILE DEVICE AND RELATED SYSTEMS

CROSS-REFERENCE TO RELATED APPLICATIONS

This application is the National Stage' of International Application No. PCT/GB2018/052188, filed Jul. 31, 2018, which claims priority to GR 20170100360, filed Jul. 31, 2017 and GB 1718507.5, filed Nov. 9, 2017, which are entirely incorporated herein by reference.

SUMMARY

The invention relates to a method of constructing a model of the motion of one or more mobile devices and related systems. In particular, embodiments may utilise Simultaneous Localisation and Mapping (SLAM). More specifically, the invention relates to the handling of identified loop closures, which may or may not be correctly identified, and preferably outputs a pose graph which provides the model of the motion.

BACKGROUND

Pose graph Simultaneous Localization and Mapping (SLAM) is one of the most popular and effective techniques for robot localisation in the prior art, and has attracted significant interest over the past decade. A pose graph is usually built by sensor front-ends with edges indicating constraints (e.g. odometry observations, typically subject to long-term drift) and nodes representing robot poses or landmarks. "Pose" is typically held to comprise both position and orientation.

Loop closures occur when revisiting an area—e.g. when it is identified by the front-end that a robot (or person) has returned to a location visited previously. A transformation between the pose of the robot on the first visit and the pose of the robot on the subsequent visit can therefore be calculated—this transformation links nodes on two different trajectories and is therefore described as a loop closure. Loop closures are represented by inserting additional edges (or constraints) into the graph.

Conveniently, a pose graph SLAM back-end can be used to derive improved robot locations by minimising the errors of the pose graph.

In pose graph SLAM systems, incorrect loop closures can hinder optimisers from converging to correct solutions, significantly degrading both localisation accuracy and map consistency. Therefore, researchers seek to enhance their robustness in the presence of numerous false-positive loop closures. False-positive loop closures refer to loop closures that are identified by the system incorrectly, i.e. which are not true loop closures.

In typical robotic applications, platforms are equipped with highly capable sensors e.g. LIDAR and vision, which can detect loop closures with a high degree of accuracy. However, in some emerging applications using less informative sensors, e.g. the Earth's geomagnetic field for smartphone based localisation, the number of ambiguous loop closures can be disproportionately higher than the true loop closures. Existing approaches tend to fail when working with unreliable front-end systems, where a large proportion, or indeed the majority, of inferred loop closures can be incorrect.

Existing back-end optimisers are tolerant of a small proportion of incorrect loop closures. However, if the number of false-positive loop closures is excessively high (e.g. >50%) then graph optimisation can perform poorly or fail entirely.

In recent years, significant effort has been made to improve the reliability of pose graph SLAM systems by enhancing the robustness of back-ends to false-positive loop closures. Existing algorithms mostly focus on how to detect false-positive loop closures and further mitigate their impacts—see, for example:

[1] N. Sunderhauf and P. Protzel, "Towards a robust back-end for posegraph slam," in Robotics and Automation (ICRA), 2012 IEEE International Conference on. IEEE, 2012, pp. 1254-1261;

[2] N. Sunderhauf and P. Protzel, "Switchable constraints for robust pose graph slam," in 2012 IEEE/RSJ International Conference on Intelligent Robots and Systems. IEEE, 2012, pp. 1879-1884;

[3] P. Agarwal, G. D. Tipaldi, L. Spinello, C. Stachniss, and W. Burgard, "Robust map optimization using dynamic covariance scaling," in Robotics and Automation (ICRA), 2013 IEEE International Conference on. IEEE, 2013, pp. 62-69;

[4] Y. Latif, C. Cadena, and J. Neira, "Robust loop closing over time," in Proc. Robotics: Science Systems, 2013, pp. 233-240;

[5] E. Olson and P. Agarwal, "Inference on networks of mixtures for robust robot mapping," The International Journal of Robotics Research, vol. 32, no. 7, pp. 826-840, 2013;

[6] E. Olson, "Inference on networks of mixtures for robust robot mapping," Robotics: Science and Systems VIII, p. 313, 2013;

[7] G. H. Lee, F. Fraundorfer, and M. Pollefeys, "Robust pose-graph loop closures with expectation-maximization," in 2013 IEEE/RSJ International Conference on Intelligent Robots and Systems. IEEE, 2013, pp. 556-563;

[8] Y. Latif, C. Cadena, and J. Neira, "Robust loop closing over time for pose graph slam," The International Journal of Robotics Research, pp. 1611-1626, 2013;

[9] L. Carlone, A. Censi, and F. Dellaert, "Selecting good measurements via I-1 relaxation: A convex approach for robust estimation over graphs," in 2014 IEEE/RSJ International Conference on Intelligent Robots and Systems. IEEE, 2014, pp. 2667-2674;

[10] M. C. Graham, J. P. How, and D. E. Gustafson, "Robust incremental slam with consistency-checking," in Intelligent Robots and Systems (IROS), 2015 IEEE/RSJ International Conference on. IEEE, 2015, pp. 117-124;

[11] A. V. Segal and I. D. Reid, "Hybrid inference optimization for robust pose graph estimation," in Intelligent Robots and Systems (IROS 2014), IEEE/RSJ International Conference on. IEEE, 2014, pp. 2675-2682; and

[12] A. D. Fourie, J. Leonard, and M. Kaess, "A nonparametric belief solution to the bayes tree," in Intelligent Robots and Systems (IROS), 2016 IEEE/RSJ International Conference on. IEEE, 2016, pp. 2189-2196.

In the past few years, several robust back-end algorithms have been proposed to tackle problems produced by false-positive loop closures. They can be roughly divided into two types in terms of the technique used:

A. approaches based on augmented model; and
B. approaches based on graph consistency.

A. Approaches Based on Augmented Model

Augmented model-based methods focus on how to model pose graph SLAM problems by taking false-positive loop closures into consideration and rejecting outliers during graph optimisation.

Sunderhauf and Protzel [1], [2] indicate that the topology of a factor graph can be partially unfixed and present the idea of Switchable Constraints (SC) where a switchable variable is given to each loop closure constraint. A constraint is turned off during optimisation once it is considered as an outlier.

Based on this work, Agarwal et al. [3] introduce Dynamic Covariance Scaling (DCS) which replaces the quadratic cost with m-estimator and reaches a faster convergence.

Olson and Agarwal [5], [6] create a mixture model by merging two different Gaussian models. Their main insight is to use a max operator between models rather than a sum operator as it can largely simplify the solution of posterior maximum likelihood.

Lee et al. [7] model the robust back-end problem as a Bayesian network and apply the Classification Expectation Maximisation algorithm to solve it. An additional variable is assigned as the weight of each loop closure constraint and finally the weights of outliers are decreased to mitigate the influence of outliers during optimisation.

Although the augmented model-based method can achieve superior performance with a reasonable number of false-positive loop closures, there are some drawbacks. For example, as reported in [3], DCS tends to be less effective to randomly distributed outliers. Furthermore, the approaches rely on parameter tuning.

B. Approaches Based on Graph Consistency

Graph consistency-based approaches aim at selecting a subset of loop closures for pose optimisation based on consistency check. The Realizing, Reversing, Recovering (RRR) algorithm [4], [8] first divides all the loop closures into several clusters according to timestamps and then applies a number of $\chi^2$ tests to check both the intra and inter cluster consistency. The individual loop closures in a cluster or the entire cluster with high $\chi^2$ errors are rejected.

More recently [9] and [10] also focus on graph consistency. However, unlike RRR, they search for the largest consistent subset of the constraints.

There are also some other works which do not belong to the above two categories. Segal et al. [11] propose an optimisation approach which applies hybrid inference on the Bayes tree. It combines non-linear least squares with discrete inference and uses discrete states to enable or disable measurements. Fourie et al. [12] propose a non-parametric method and obtain a more general solution to the Bayes Tree.

Although these approaches have contributed towards accurate localisation, it is still challenging for the approaches to operate in the presence of numerous false-positive loop closures.

DETAILED DESCRIPTION

Embodiments described herein therefore aim to ameliorate at least some of the problems described above and/or provide a method/system that more accurately localises within an environment.

According to a first aspect of the invention, there is provided a computer-implemented method of constructing a model of the motion of a mobile device. The method may comprise using a sensor of the device to obtain data providing an estimated pose of the mobile device; the data may be referred to as positional data. An initial graph is then generated which may be based upon the positional data from the sensor, nodes of which graph provide a series of possible poses of the device, and edges of which graph represent odometry and/or loop closure constraints. The method may then process the graph to estimate confidence scores for each loop closure. Typically, the confidence score is generated by performing pairwise consistency tests between each loop closure and a set of other loop closures. Conveniently, the method then generates an augmented graph from the initial graph.

Generating the augmented graph may comprise retaining and/or deleting each loop closure based upon the confidence scores.

Generation of the augmented graph may further include the step of inserting artificial loop closure edges into the graph between pairs of retained loop closures. In such embodiments, the artificial loop closures may be created by selecting one or more pairs of nodes of the graph and calculating an edge to link the pair of nodes, each new edge representing a new loop closure. The artificial edges may be calculated by determining a transformation that transforms the pose of a first node of the pair to a pose of second node of the pair.

The consistency checks performed between pairs of nodes may be spatial consistency checks.

The estimated pose of the mobile device may be determined relative to one or more of:
(i) the initial pose of the device;
(ii) a previous pose of the device other than the initial pose; and/or
(iii) a previous or current pose of another device.

A loop closure may be deleted from the graph if its confidence score is below a first level. The first level may be fixed or learned. In such embodiments, a loop closure may be retained if the confidence score is above the first level.

The loop closures may be clustered into two groups using k-means clustering or other clustering. The loop closures in the group, generated by the clustering, with the lower centre value of the two groups may be deleted from the graph. The group with the lower centre value may be described as the outlier group. A loop closure may be retained if it is in the group with the higher centre value. The group with the higher centre value may be described as the inlier group.

A pair of loop closures may be used to seed the generation of artificial loop closures if the relevant confidence scores are above a second level. The second level may be fixed or learnt from the data.

In embodiments using k-means clustering, the second level may be the centre value of the retained group (the inlier group).

The method may further comprise using the augmented graph to generate a model of the internals of a building. The model may be thought of as a map or the like.

The method may further comprise using the augmented graph to allow a first device of the one or more mobile devices to localise itself with respect to the trajectories of the other mobile devices.

The device may be a mobile telephone, smart watch, inertial measurement unit (IMU), or smart camera.

The device may be arranged to be carried by a person, robot, or vehicle.

The device may be, or may be a part of, a vehicle or robot able to move itself.

According to a second aspect of the invention, there is provided a machine-readable medium containing instructions which, when read by a processor, cause that processor to implement the method of the first aspect of the invention.

According to a third aspect of the invention, there is provided system comprising a processor arranged to perform at least one of the following steps:
 a) obtain an initial graph based upon positional data from a sensor of a mobile device (conveniently, nodes of which graph provide a series of possible poses of the device, and edges of which graph represent odometry and/or loop closure constraints);
 b) process the graph to estimate confidence scores for each loop closure by performing pairwise consistency tests between each loop closure and a set of other loop closures; and
 c) generate an augmented graph from the initial graph by retaining and/or deleting each loop closure based upon the confidence scores.

The processor may be arranged to insert artificial loop closures into the graph between pairs of retained loop closures. The processor may be further arranged to identify a subset of the retained loop closures based on the confidence scores, and to use only loop closures in the subset of the retained loop closures to seed artificial loop closures.

The system may further comprise the mobile device. The mobile device may comprise, or have mounted thereon, the sensor which is arranged to provide the positional data.

The system may be provided by the mobile device. The mobile device may comprise, or have mounted thereon:
 (i) the sensor which is arranged to provide the positional data; and
 (ii) the processor.

The steps may be split between a plurality of processors; any reference above to "a processor" may therefore equivalently mean two or more processors sharing the processing.

Since no algorithm can easily remove all false-positive loop closures, pose graph SLAM systems can be made more robust by enlarging the proportion of inliers, namely correct loop closures, to outliers (false-positive loop closures) within pose graphs. To this end, techniques disclosed herein may not only reject false-positive loop closures, but also inject additional true-positive loop closures by reinforcing loop closures that are highly consistent with one another. The results discussed herein demonstrate how this novel combination of approaches can yield benefits in the face of high proportions of erroneous loop closures.

Aspects and/or embodiments may provide at least one of the following contributions:
 1) a mechanism to reliably detect and remove false-positive loop closures, may be within a middle layer, even if they form the overwhelming majority; and
 2) artificial loop closures are automatically reconstructed and injected into pose graphs in the framework of an Extended Rauch-Tung-Striebel smoother, which has and advantage of reinforcing reliable loop closures.

The skilled person would understand that features described with respect to one aspect of the invention may be applied, mutatis mutandis, to the other aspects of the invention.

The machine readable medium referred to in any of the above aspects of the invention may be any of the following: a CDROM; a DVD ROM/RAM (including -R/-RW or +R/+RW); a hard drive; a memory (including a USB drive; an SD card; a compact flash card or the like); a transmitted signal (including an Internet download, ftp file transfer of the like); a wire; etc.

BRIEF DESCRIPTION OF THE DRAWINGS

There now follows by way of example only a detailed description of embodiments of the present invention with reference to the accompanying drawings in which:

FIG. 4 illustrates spatial consistency checks of pairs of loop closures, in line with an embodiment of the invention;

FIG. 5 illustrates the formulation of a graphical model for potential artificial loop closures in line with an embodiment of the invention;

The embodiment being described implements a middle layer, embedded between front- and back-ends, to boost the robustness of a SLAM (Simultaneous Localisation And Mapping) system. In many embodiments, the embedding is such that identical front- and back-ends can be used as in the prior art. The skilled person will appreciate that embodiments need not be implemented in a so-called middle layer and could be provided as part of other elements, or indeed in other topologies.

Embodiments are described in relation to the localisation of one or more devices moving in an environment. Here, a device may be any device capable of providing data giving an estimate of the device position; i.e. positional data. Such a device may be carried by a person (e.g. smartphone/smartwatch), a robot (e.g. ground/aerial) or an object (e.g. wheelchair). The skilled person will appreciate that there is a level of uncertainty in the data provided by any sensor, and whilst some sensor modalities are more accurate than others, the positional data will only give an estimate of the device position. The positional data may be generated from any suitable sensor but in particular the sensor may be any of the following examples: magnetometers; accelerometers; gyroscopes, WIFI, GSM (Global System for Mobile communication), UMTS (Universal Mobile Telecommunication System), LTE (Long Term Evolution), cameras, GPS (Global Positioning System—including GLONASS, Galileo, BeiDou-2, etc.), LiDAR (Light Detection and Ranging), cameras, and the like.

Conveniently, the device is arranged to process positional data locally using processing circuitry that is part of that device. However, it is conceivable that the positional data is processed remote from the device, or indeed partially processed on the device and partially processed remote from the device. The skilled person will appreciate how to modify embodiments to split the processing between devices and in view of this the following description is agnostic as to where the processing is performed. The skilled person will appreciate that a mobile device may simply gather and transmit sensor data for remote processing, and may not perform any significant data processing locally.

Embodiments which process positional data remotely will typically have a network connection thereto. Such a network connection will likely be provided by technologies including GSM; UMTS; LTE; WIFI; Bluetooth; or the like.

In summary, embodiments are arranged to alter a pose graph (conveniently referred to as a graph herein). Conveniently, the pose graph is generated by a front-end. Further conveniently, the altered graph can then be optimised by a back-end system.

Extensive experiments have been conducted to demonstrate the significantly improved accuracy and robustness compared with state-of-the-art methods and various backends, verifying the effectiveness of the proposed approach (see FIGS. 2, 6, 7, 8 and 9, discussed below).

I. System Overview

Figure 1:
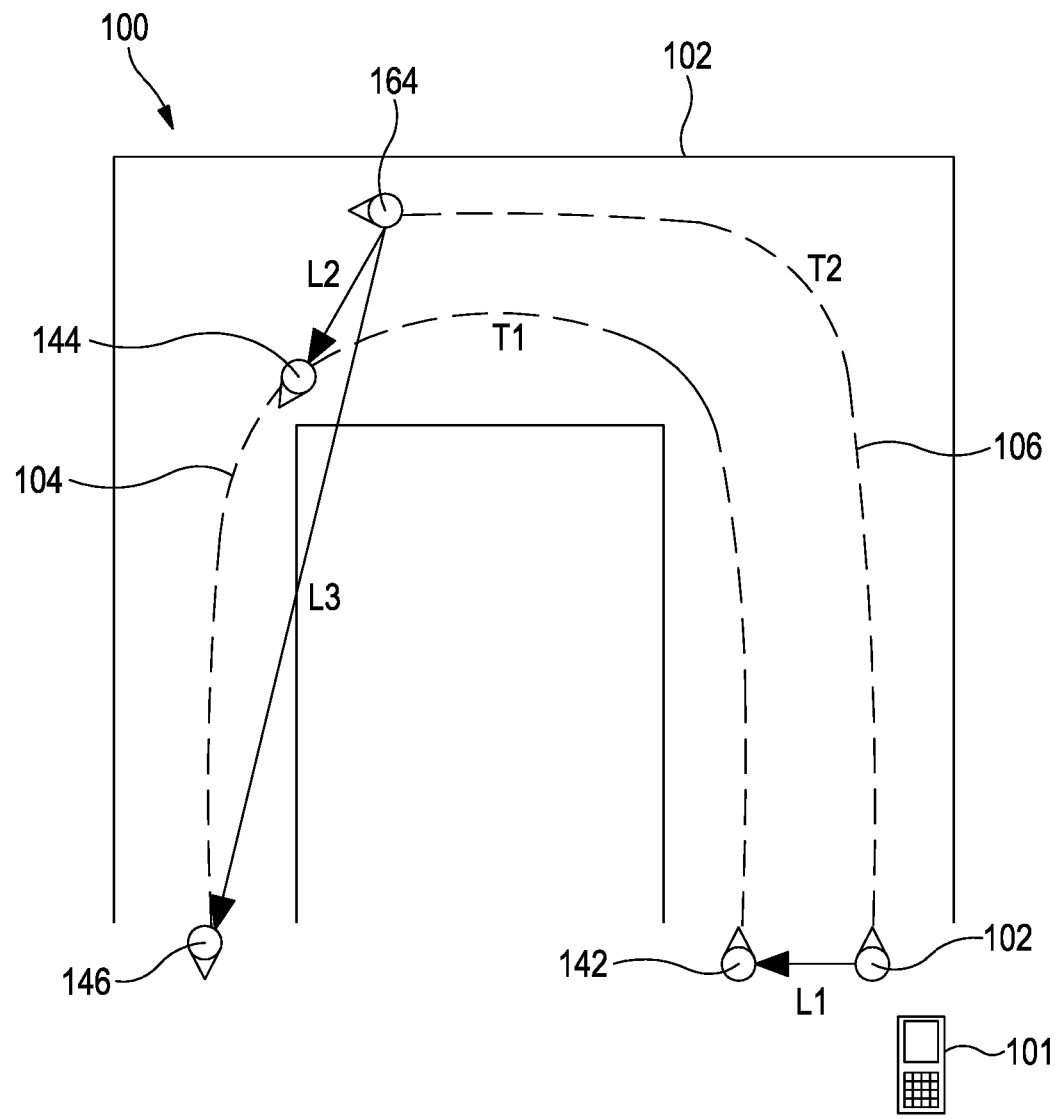
FIG. 1 illustrates loop closures of two trajectories, T1 and T2, in a corridor.

For the avoidance of doubt, FIG. 1 is used to describe the concept of Loop Closure as described in relation to embodiments herein. FIG. 1 shows an example environment 100 comprising a corridor 102, on which a first trajectory (T1) 104 and a second trajectory (T2) 106 of a device 101 along the corridor 102 are marked. Thus, in the embodiment being described, the corridor 102 provides an environment through which the device 101 is moved. The embodiment is arranged to generate a model of the movement of the device 101 and the pose graph may be thought of as providing a model of the motion of one or more mobile devices.

The embodiment being described therefore does not model the environment 102 per se, but rather the motion of one or more devices 101 in the environment. The skilled person will appreciate that, indirectly, this can allow estimation of an approximate map of the environment 102, especially when a large number of devices 101 or of trajectories of the same device 101 pass through the environment. For example, this could be used for the generation of approximate floorplans based on crowdsourced data, or other collection mechanisms of data.

Three loop closures, L1, L2 and L3, are marked, where a loop closure, as the skilled person will appreciate, can be thought of as a determination that the device has previously visited that location, within a degree of confidence.

FIG. 1 illustrates an example where a device 101 passes the same place twice with trajectory segments T1 (104) and T2 (106), respectively. Assume that the front end discovers three loop closures—L1, L2 and L3 that link nodes in the two trajectories. A loop closure typically contains information about the relative pose between two nodes and corresponding covariance. Suppose only loop closures L1 and L2 are true-positives, i.e., their relative poses are correct, whereas loop closure L3 is a false-positive, i.e. one having an incorrect relative transformation, as described below.

FIG. 1 shows the following loop closures:

Loop closure L1 indicates that a first point 142 on the first trajectory (T1) 104 and a first point 162 on the second trajectory (T2) 106 have been localised relative to one another; whilst this does not necessarily require them to be physically close, it is usual for loop closures to be between nodes in the same part of the environment, which in this case is the corridor 102. The skilled person will appreciate that the loop closure does not indicate or require any information about the environment itself—the environment could as easily be a field, road or any other environment. No knowledge of any map or the likes is required.

Loop closure L2 indicates that a second point 144 on the first trajectory (T1) 104 and a second point 164 on the second trajectory (T2) 106 have been localised relative to one another.

Loop closure L3 indicates that a third point 146 on the first trajectory (T1) 104 and the second point 164 on the second trajectory (T2) 106 are again localised relative to one another.

In FIG. 1, Loop closures L1 and L2 are true-positives; i.e., L1 and L2 are correct in identifying the relevant points as having an estimated transformation (relative pose) between them. However, L3 indicates a false-positive loop closure. The distance between two end points (i.e. nodes) of a loop closure is not necessarily short; i.e. they do not have to represent physically close locations. Once the transformation is confirmed to be similar to ground truth, a given loop closure is identified as a correct one. A comparison of L3 to ground truth would show that L3 does not match ground truth, and so is an incorrect loop closure.

Although the longest loop closure (L3) in FIG. 1 is stated to be incorrect, the fact that it is the longest is merely coincidental. As a loop closure itself is an edge, a constraint between two nodes, it can contain a large displacement. The skilled person will appreciate that, in practice, loop closures are generally detected when two places are physically close because it is much easier to get similar observations of these two nodes and detect the loop closure. Any references herein to loop closures relating to "the same place" or having end points which are "close" are to be interpreted in this light.

The same applies to newly inserted (artificial) loop closures; in embodiments being described, a transformation for an artificial loop closure is calculated with a probability propagation method, for example an RTS smoother.

The skilled person will appreciate that a distance between two end-points of a loop closure is not necessarily short—the nodes do not necessarily have to be physically "close". Where the transformation indicated by the loop closure is similar to ground truth, the loop closure is correct. In FIG. 1, L3 is a false loop closure, but the skilled person will appreciate that loop closures with a large transformation are not necessarily false loop closures.

Many false positives result from two places which are far from each other but which have certain features in common; similar observations of the two different places can be obtained due to insufficient features in the observation, leading the approach used to think that the two places are close or the same.

Further, the definition of "close" can vary between embodiments, and it is not necessary for the two poses to be physically close (there may be no specific requirement on distance, such as 1 or 2 meters). Whether or not there is a loop closure may, in some embodiments, be determined by the confidence in the positional data, or other similar constraints. The loop closure expresses the transformation (position and orientation) constraint between two poses (from single or multiple devices). Once the transformation can be calculated accurately, the physical distance is not important.

In the embodiment being described, this is normally assessed in two steps:
(i) First, a loop closure is detected between two poses (graph nodes) by checking sensor data similarity, e.g., looking at image appearance and magnetic magnitude; and
(ii) Then, if the similarity is high, the transformation between the two poses (graph nodes) is calculated. This transformation can be determined in the front-ends by using different techniques, which depend on the sensor type, system requirement, and even operating environment etc.

The same applies for the artificial loop closures discussed below and their transformations are calculated with a probability propagation method—in this case an Rauch-Tung-Striebel (RTS) smoother.

In FIG. 1, L1 and L2 contain correct relative poses between their terminals but L3 does not.

Figure 3A:
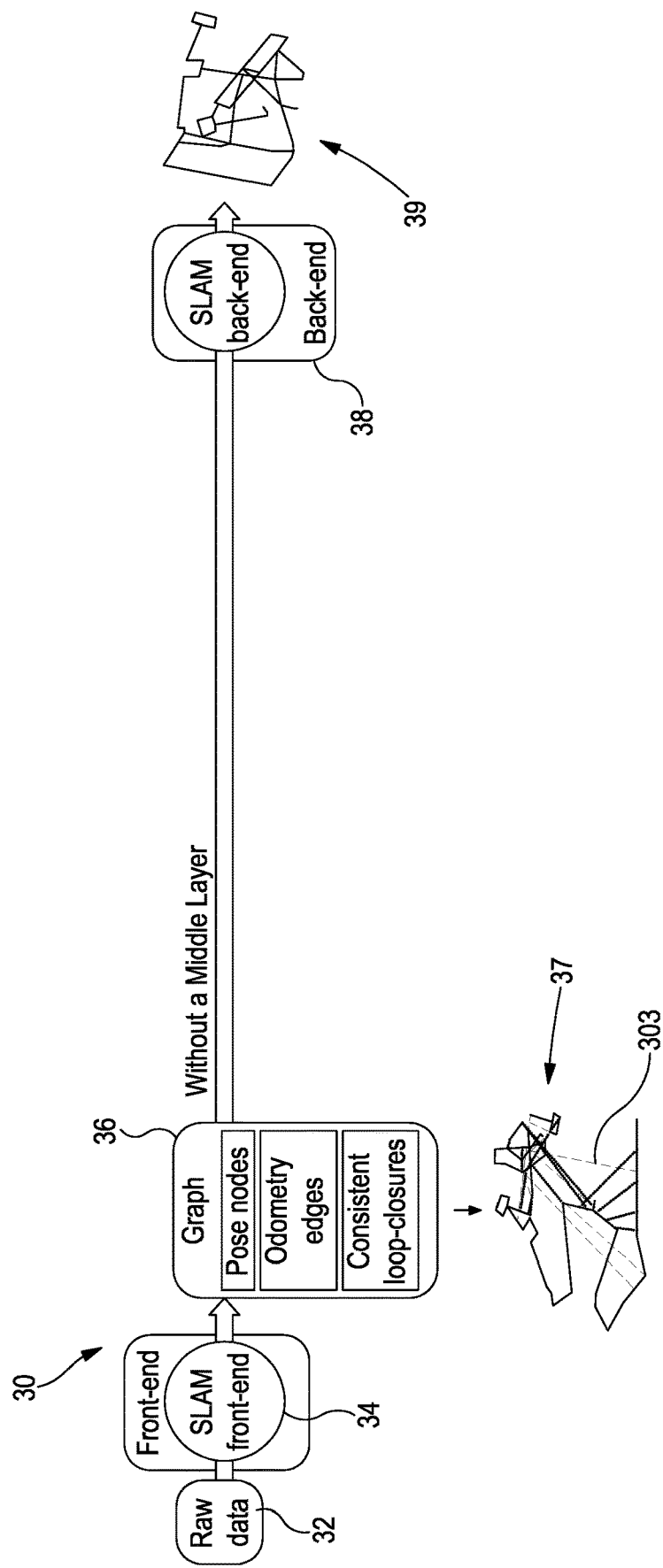
FIG. 3A (PRIOR ART) schematically illustrates prior art SLAM methodology.
Figure 3B:
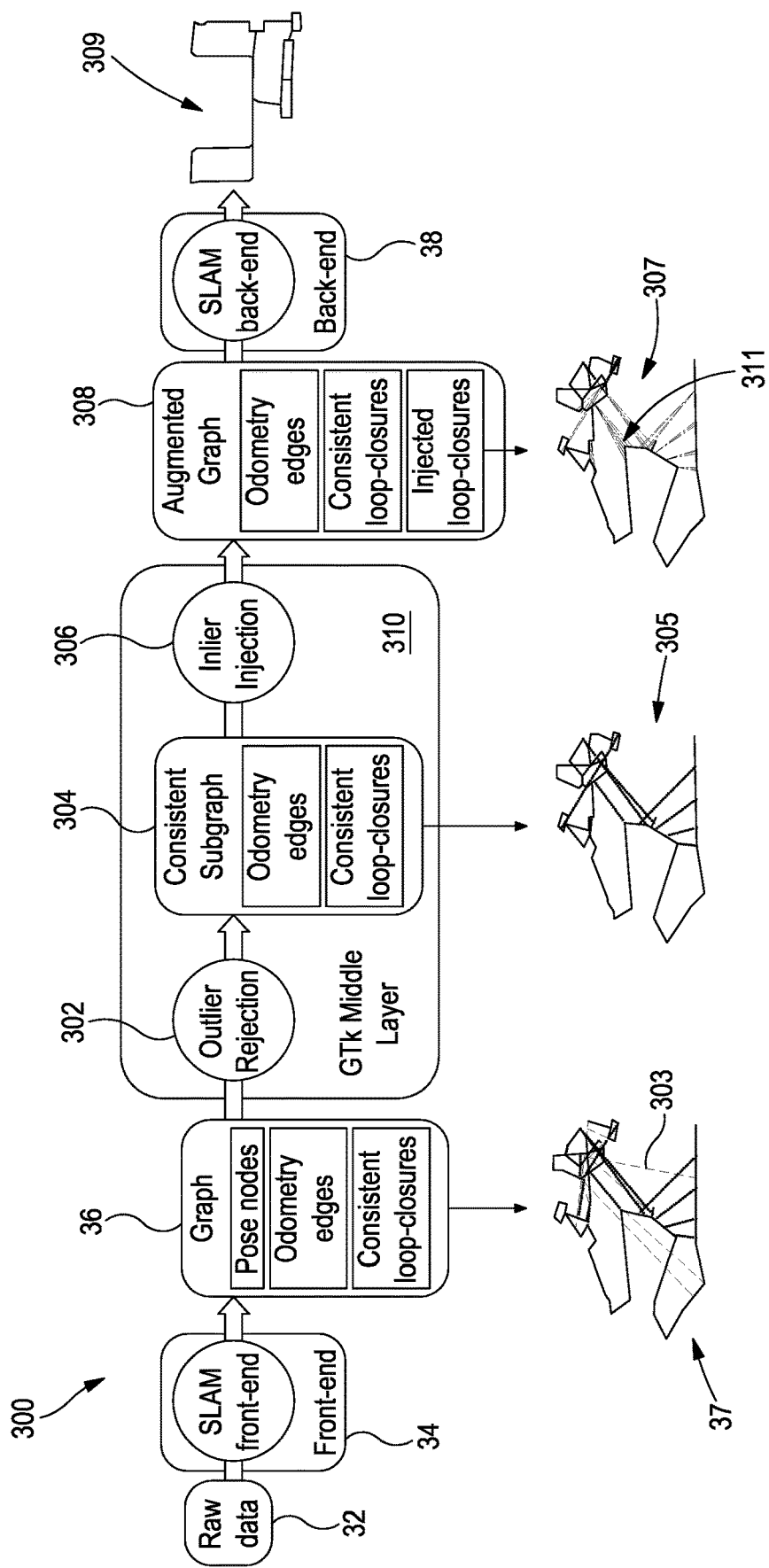
FIG. 3B schematically illustrates SLAM methodology according to the present invention.

FIGS. 3A and 3B compare and contrast prior art system architecture 30 (FIG. 3A) with the system architecture 300 of the embodiment being described (FIG. 3B).

In FIG. 3A, relatively thin, solid lines are used for odometry edges, relatively thick, dotted lines for true loop closures and relatively thin, dashed lines 303 for false loop closures. In FIGS. 3A and 3B, there are dash-dotted lines 311 in addition—these lines 311 show artificial, added loop closures.

It can be seen that the system architecture 300 of the embodiment being described (one implementation of the embodiments provided here is provided by the Graph-Tinker (GTk) algorithm provided by the inventors) has an extra portion 310 as compared to the prior art system architecture 30. That is, the embodiment being described is implemented as a middle layer 310 between a SLAM front-end 24 and back-end 38.

The prior art architecture 30 takes raw data 32 and passes this to a SLAM front-end 34. An initial graph 37 (a pose graph) is then formed by a graph module 36 of the front-end 34, the initial graph 37 including pose nodes, odometry edges and loop-closure edges. The pose nodes may conveniently be referred to as nodes and provide what may be thought of as a possible position and orientation of the device at a given instance.

Typically, a node has an associated probability function that gives the probability of a device being at that position. In the pose graph of the embodiment being described, all the nodes are modelled as a Gaussian distribution which uses a mean and covariance matrix to represent the probability of the position or pose of this node.

This graph 37 is then passed to a SLAM back-end 38. The SLAM back-end 38 performs further processing and outputs a final graph 39.

In the embodiment being described, the same raw data 32 is passed to a SLAM front-end 34, in the same manner as in the prior art. Indeed the front-end 34 may be the same front end as that used in the prior-art. Should the same front end be used, the same graph 37 as for the prior art system 30 is then formed by the graph module 36 of the front-end 34, the graph 37 including pose nodes, odometry edges and loop-closure edges.

However, in the embodiment being described, this initial graph 37 is not passed directly to the back-end 38, but rather to a middle layer 310.

As described in more detail below, the middle layer 310 performs outlier rejection at an outlier rejection module 302. The outlier rejection module 302 detects and eliminates inconsistent loop closures (i.e. outliers—for example line 303 which may be thought of as being equivalent to the loop closure L3 of FIG. 1). The outliers are deleted from the graph 37. The outlier rejection module 302 generates 304 a consistent subgraph 305 which corresponds to the initial graph 37 with outlier (inconsistent) loop closures e.g. 303 removed and the other loop closures retained. The consistent subgraph 305 therefore includes pose nodes, odometry edges and consistent loop closures, and can be thought of as an augmented graph as its accuracy has been increased by deletion of false-positives (outliers).

Inlier injection is then performed on the consistent subgraph 305 by an inlier injection module 306. A set of artificial loop closures are reconstructed and inserted through the inlier injection module 306, generating 308 an augmented graph 307.

The augmented graph 307 includes pose nodes, odometry edges, consistent loop closures (the original loop closures deemed to be correct) and injected loop closures (loop-closures generated based on the original loop closures deemed to be correct). The injected loop closures within the augmented graph 307 facilitate a more robust output from the back-end 38 in view of more positive loop closures (see for example region 311 of graph 307).

In the embodiment being described, the augmented graph 307 is then passed to the back-end 38 as used in the prior art architecture 30. As the augmented graph 307 is more accurate than the first (initial) graph 37, the final graph 309 output by the back-end 38 in the embodiment being described is different from that output by the prior art system 30, even if an identical back-end 38 is used to the prior art system 30. Here, the final graph 309 provides what may be thought of as a model of the motion of the device 101 through its environment.

The skilled person will appreciate that embodiments may use trajectories of a plurality of devices—a loop closure may indicate that one device, A, is in the same place as another device, B, was previously (or at least in a place sufficiently close and well-identified for a transformation between the two to be calculated with confidence); the trajectories used to form loops may not have been travelled by the same device.

The three pose graphs 37, 305, 307 give an example using the MIT-Killian-Court dataset. Dashed 303 and dash-dotted 311 lines represent false-positive and injected loop closures, respectively.

FIG. 3B shows an overview of a system 300 of the embodiment being described.

Conveniently, embodiments structure themselves as a middle layer 310 which is a complement to prior art back-ends 38, and which can operate in tandem with them. However, the skilled person will appreciate that the concepts described herein need not be so structured.

The middle layer 310 of the embodiment being described takes, as its input, an initial pose graph 36, 37 from a front end 34 (i.e., in at least this embodiment, a process that generates a pose graph 36, 37) and outputs an augmented pose graph 307 for use by the back-end 38.

From the description of FIG. 3B above, it can be seen that in the embodiment being described, the middle layer 310 may be described as having two steps. Firstly, middle layer 310 is arranged to detect and remove false-positive loop closures (outliers) through the outlier rejection module 302, retaining consistent loop closures. Secondly, a subset of the consistent loop closures is then selected to reconstruct artificial loop closures and create an augmented graph based on the inlier injection module 306.

The generation of artificial loop closures can be thought of as the identification of correct but previously undetected loop-closures. The inlier injection module 306 uses the known loop closures in which there is confidence along with odometry data to establish which other pose nodes are actually nearby, and the transformations between them, and injects these as additional loop closures.

The division of loop closures into subsets (outliers, and then separating the consistent loop closures (inliers) into a subset to be used to generate artificial loop closures and the remainder) is performed as described below in the embodiment being described:

After calculating the pass rate of each loop closure, k-means clustering is used to classify all loop-closure into two groups according to the pass rate. Based on k-means, each group has a centre value. The group with a higher centre value of pass rate is regarded as the group containing correct loop-closures and is called the inlier group while the other group is call outlier group, and is rejected.

More specifically, the following steps are followed in this embodiment:
  i) Class loop closure as outlier and reject it if it is in the outlier group;
  ii) Preserve loop closure but do not use it for artificial loop closure generation if it is in the inlier group but its pass rate is lower than the centre value of the inlier group;
  iii) Preserve loop closure and additionally use it for artificial loop closure generation if it is in the inlier group and its pass rate is higher than the centre value of the inlier group.

Thus, in the embodiment being described, the middle layer 310 generates what may be thought of as an augmented pose graph 307, 308, which augmented pose graph 308 is then passed to a SLAM back-end 38 for the back-end 38 to calculate appropriate device poses through optimisation. The embodiment being described used g2o in the back-end 38 (as described in R. Kummerle, G. Grisetti, H. Strasdat, K. Konolige, and W. Burgard, "g 2 o: A general framework for graph optimization," in Robotics and Automation (ICRA), 2011 IEEE International Conference on. IEEE, 2011, pp. 3607-3613).

Further information on graph SLAM and its back end can be found in each of:
  G. Grisetti, R. Kummerle, C. Stachniss, and W. Burgard, "A tutorial on graph-based slam," IEEE Intelligent Transportation Systems Magazine, vol. 2, no. 4, pp. 31-43, 2010; and
  S. Thrun, W. Burgard, and D. Fox, Probabilistic robotics. MIT press, 2005.

In the next subsection, methods of applying spatial consistency checks to estimate whether a loop closure is correct or not are discussed.

A. Detection and Selection of Consistent Loop Closures
  1) Spatial Consistency Test for a Pair of Loop Closures:

A spatial consistency test is applied to each pair of loop closures in the constructed graph. FIG. 4 demonstrates this for two example pairs, namely (L1, L2) and (L1, L3) for two trajectories, T1 104 and T2 106. The skilled person will appreciate that, as embodiments check consistency in the context of a pair of loop closures, knowledge about the underlying distribution is not required.

Consider as a first example, and referring to FIG. 4, the two loop closures L1 and L2. The two trajectory segments between these two loop closures (together with the loop closure edges) form a closed chain (or cycle) in the pose graph 402, 404, 452, 454. Consistency between the two loop closures is tested by travelling along this cycle and checking whether it is possible to return to the initial point.

For example, starting at the initial point of trajectory T1, in any of the four sub-figures of FIG. 4, with an initial pose vector and a zero covariance matrix, with the relative translation and rotation information provided by the odometry of T1, loop closure L2, then the odometry of T2 and then loop closure L1, the final pose after travelling around the cycle can be calculated. The spatial consistency is indicated by the probability that the final pose is equal to the initial pose. Notice that in this process odometry edges (and loop closure edges) can be traversed in any direction (the direction in which an edge was originally traversed by the device 101 is not limiting).

The top two graphs 402, 452 in FIG. 4 illustrate ground-truth trajectories T1, T2 and the true transformations L1, L2 between the terminal nodes of each (ground truth). In various embodiments, this true information may not be known, so a model is the best available estimate. The bottom two graphs 404, 454 in FIG. 4 illustrate such a model (calculated pose graphs in this case).

In particular, on the left hand side 400 of FIG. 4, the pair of loop closures L1 (the first loop closure) and L2 passes the spatial consistency test since it almost returns back to the initial pose after traversing the loop. The graph 402 on the top left illustrates ground truth of the two trajectories and pertinent loop closures. The graph 404 on the bottom left illustrates the model of the same information (i.e. odometry edges found by dead reckoning and loop closures calculated for a device which, in truth, followed the route shown in the top graph 402), but where the initial position of T1 segment is set at the origin and its initial orientation is that of the positive x-axis. The trajectory edges T1, T2 are determined by dead reckoning and the loop closures L1, L2 are calculated. In the left hand side 400, the two loop closures L1 and L2 pass the spatial consistency test because their relative displacement between end points are consistent with the true displacement of these two places rather than because their two end points are close to each other. The fact that the initial and final poses are close is a helpful confirmatory indication that L1 and L2 have correctly linked points.

L3 fails the spatial consistency test when jointly tested with any other loop closure, so is a false positive and inconsistent with the true displacement of two places.

The skilled person will appreciate that the top graph 402 is equivalent to the bottom graph 404 with a rotation and translation to set the initial position as the origin—the trajectories and loop closures match the ground truth.

By contrast, on the right hand side 450 of FIG. 4, loop closures L1 and L3 are shown to be inconsistent with each. This indicates that either loop closure L1 or loop closure L3 may be incorrect (or both). The skilled person will appreciate that the top graph 452 is not equivalent to the bottom graph 444, even with a rotation and translation to set the initial position as the origin—the trajectories and loop closures calculated from dead reckoning data do not match the ground truth. By comparison to the ground truth, or by comparison of spatial consistency between L1 and L2 and between L3 and L2, L3 is identified as the incorrect loop closure.

The intuition is that the relative poses encapsulated in the loop closure pair should be consistent with the odometry information of the outbound and inbound trajectory segments (i.e. the portions of the trajectory between pose nodes of the loop closures). Here a segment, as will be understood by the person skilled in the art, is a section (i.e. segment) of a trajectory, such as for example each T1 and T2. Two loop closures and the trajectories between them form a closed chain, or circle in the graph, as shown in FIG. 4. An assumption made by systems 300 of the embodiment being described is that odometry edges only suffer from limited cumulative drift, and large, abrupt odometry errors are not experienced. Under this assumption, the consistency of the loop closure pair can be tested based on the combination of a probability propagation by dead-reckoning and a $\chi^2$ test.

More specifically, inspiration is drawn from the statistics method in M. Mazuran, G. D. Tipaldi, L. Spinello, W. Burgard, and C. Stachniss, "A statistical measure for map consistency in slam," in Robotics and Automation (ICRA), IEEE, 2014, pp. 3650-3655 to measure the consistency between two loop closures. For simplicity, the initial point of trajectory T1 is taken as a starting point with an initial pose vector and a zero covariance matrix. With the relative pose information provided by both odometry edges and loop closure edges, the probability distribution of final pose after traversing the circle can be calculated through dead reckoning. The relative pose and covariance matrix of the odometry edges in the inbound trajectory T2 and loop closure L1 are calculated in a reverse direction to form a unidirectional circle. Then, it can be assumed that the mean of the distribution of final pose should be close to the initial pose if these two loop closures are consistent with each other. This is because the error provided by odometry drift should be small when the distance travelled is short. Thus, a null hypothesis of a distribution where the mean is a zero vector (the same as initial pose) and the covariance is equal to the one of calculated final pose is provided. Eventually, a $\chi^2$ test is applied to check whether the final pose is accepted as the null hypothesis.

As shown in FIG. 4, since loop closures L1 and L2 are true-positive and their relative poses recorded by the front-end system are correct, the probability of returning back to the near neighbour of the initial pose after traversing the outbound and inbound trajectories is relatively high. In contrast, this is not applicable to L1 and L3 due to the wrong relative pose between two nodes from the false-positive loop closure L3.

Based on the pose nodes, odometry edges and loop closure edges, it is possible to calculate the probability distribution of a final pose matching with its initial pose.

Let $p_0^{T_i}, p_1^{T_i}, \ldots p_{n_i}^{T_i}$, be the poses of trajectory $T_i$, and $\aleph(u_1^{T_i}, s_1^{T_i}) \ldots \aleph(u_{n_i}^{T_i}, s_{n_i}^{T_i})$ the normal distributions of the corresponding odometry edges. Taking loop closures $L_1$ and $L_2$ as an example, let the two loop closure edges follow distributions $\aleph(l_1, s_1^l)$ and $\aleph(l_2, s_2^l)$ respectively. Note that the above data are all available directly in the constructed pose graph. The relative poses and covariance matrices in the inbound trajectory segment T2 and loop closure L1 are reversed to form the unidirectional circle. Define the probability distribution $p_0$ of the initial pose as:

$$p_0 \sim \aleph(m_0, S_0), m_0 = (x_0, y_0, \theta_0)^T, S_0 = 0 \quad (1)$$

where 0 is a 3×3 zero matrix. Therefore, the distribution of the final pose $p_{fin} \sim \aleph(m_{fin}, S_{fin})$ can be derived with the following chain equations:

$$m_k = f(m_{k-1}, i_k), k \in 1, 2, \ldots, n_1 + n_2 + 2, \quad (2)$$
$$i_k \in \{u_1^{T_1}, \ldots u_{n_1}^{T_1}, l_1, u_1^{T_2}, \ldots, u_{n_2}^{T_2}, l_2\},$$
$$S_k = S_{k-1} + J_k S_k J_k^T + V_k,$$
$$J_k = \frac{\partial f}{\partial i_k}, V_k \in \{S_1^{T_1}, \ldots, S_{n_1}^{T_1}, S_1^l, S_1^{T_2}, \ldots, S_{n_2}^{T_2}, S_2^l\}$$

where $m_k$ and $S_k$ are the mean and covariance of the dead reckoning at time k, $I_k$ and $V_k$ are mean and covariance of the control variable at time k, and f(•) is device's motion model. $p_{fin}=p_{n_1+n_2+2}$ indicates the probability distribution of the final pose, which gives a distribution of the final position after traversing through the loop. In the embodiment being described, this distribution itself is not used to provide a level of confidence as to whether two loop closures are spatially consistent, but is used as part of a test. A $\chi^2$ test is applied to decide whether the calculated distribution should be accepted as the null hypothesis where the final pose is a zero mean distribution. If $m_{fin}^T S_{fin} m_{fin} < \chi^2(\alpha)$ the null hypothesis is accepted and it is considered that this pair of loop closures is consistent with a confidence of 1−α. $\chi^2(\alpha)$ is the inverse function of chi-square cumulative distribution function and α is set to be 0.1 as default. The skilled person will appreciate that, in the chi-squared test, there are several commonly used value including 0.01, 0.05, 0.1. The value of 0.1 was chosen to be less strict (as compared to the other two standard values listed), but more strict, or still less strict, values could be used in other embodiments.

This confidence is given by the parameter alpha of the chi-squared test. If a small alpha is set and the pair of loop closures still passes the chi-squared test, there is a high confidence that these two loop closures are spatially consistent with each other. A confidence score may be assigned to the pair of loop closures indicating that they are consistent; this may be termed a high confidence score within the method being used.

A confidence scores for a single loop closure is calculated by performing multiple pairwise spatial consistency tests between that loop closure and other loop closures, as is discussed in more detail below.

Measuring the spatial consistency on each pair of loop closures is undesirable since long trajectory segments suffer from large accumulative drifts on odometry, leading to an inaccurate result from a spatial consistency test. Another reason is that computational overhead grows quadratically with respect to the number of loop closures. Thus, in the embodiment being described a limitation is set on the maximum distance of two trajectory segments between loop closures.

2) Loop Closure Selection:

When all spatial consistency tests are finished, each loop closure L may pass $n_p$ tests and fail in $n_f$ tests. It can be assumed that the ratio between $n_p$ and $n_p+n_f$ which is named as pass rate should be similar to the true-positive rate (ratio between the number of true-positives and all the loop closures) in the graph. The intuition behind this assumption is that true-positives are more likely to be consistent with each other while a false-positive struggles to be consistent with any other loop closure. Since random outliers are the main focus in the initial graph 37, being the most common type of outliers generated by front-end systems 34, all loop closures, including true-positives and false-positives, tend to be evenly distributed in the graph 37 in some degree, especially when the number of loop closures is quite large. Therefore, the local ratio true-positive rate should be similar to the global true-positive rate. To filter out false positives, a threshold Theta based on the pass rate of each loop-closure is used; filtering out false positives may be thought of as rejecting loop closures that fall below a certain pass rate. This threshold may be fixed or it may be determined based on the pass rate values of existing loop closures by statistical methods, such as clustering (e.g. mixture of Gaussians or k-means). In the embodiment being described, k-means clustering is used.

Thus, it can be seen that the pass rate of a loop closure may be thought of as determining a confidence (or validity) score for that loop closure. This may be thought of as a level of confidence in that loop closure. The skilled person will appreciate that other functions of $n_p$ and $n_f$ could be used to derive alternative metrics of confidence.

Therefore, after the above loop closure detection and selection, a consistent subgraph 305 where, at least, the majority of the loop closures are true-positive is produced. It is worth noting that it is not necessary to eliminate all false-positives at this stage because in the subsequent reconstruction steps, artificial loop closures will be constructed and injected to further reinforce true-positive loop closures of this subgraph.

B. Loop Closure Reconstruction

This section explains how artificial loop closures are reconstructed and then introduced into a subgraph 305 previously generated with selected consistent loop closures. These artificial loop closures may be thought of as the generation of additional loop closures seeded from loop closures that have high confidence (or validity) scores (i.e. a good degree of confidence).

1) Searching Neighbour:

Each consistent loop closure is first assigned with a consistent neighbour loop closure, which is discovered by a shortest path algorithm among loop closures. More specifically, in the embodiment being described, by starting at one node of the selected loop closure, a Dijkstra's shortest path algorithm is employed to find another loop closure that is on the shortest path between the two nodes of the selected loop closure and is spatially consistent with it. The search result is accepted if and only if a unique loop closure exists on this shortest path and the length of the shortest path is under a maximum distance threshold. Thus, a pair of loop closures in the graph is selected as a candidate to seed further loop closures between them.

The reason for constructing artificial loop closures between a loop closure and its consistent neighbour rather than all consistent loop closures is that a spatial consistency test is generally more reliable when the distance traversed on the circle is shorter due to odometry drifts. As such, an advantage of constructing loop closures in this manner is that more robust artificial loop closures e.g. 311 are generated. A way of ensuring that artificial loop closures are inserted between two correct loop closures is to demand that both loop closures have high confidence (validity) scores, i.e. the confidence metric (e.g. pass rates) of both loop closures may exceed a more stringent threshold (Theta') than the one used (Theta) to decide whether to keep or reject loop closures. This more stringent threshold can be set to a fixed value or determined based on the data via statistical methods, such as clustering (as the original threshold Theta). Theta and Theta' may be thought of as first and second levels of confidence.

2) Calculating Relative Pose Between Trajectory Segments:

For each loop closure that has a consistent neighbour, artificial loop closures 311 are constructed on the two trajectory segments between them. To this end, two kinds of information are used. One is connectivity indicating which two pose nodes should be connected by an artificial edge, which can be calculated to link the nodes. The other is a relative transformation between the two pose nodes and its covariance matrix. To calculate them correctly, it is useful to know the relative transformation between two trajectory segments.

Since the relative transformation between the two trajectory segments can be defined by either the selected loop closure or its consistent neighbour loop closure, the one having passed more spatial consistency tests, which indicates a stronger consistency, is used. In the embodiment being described, if the two loop closures coincidentally have equal consistencies, one is randomly chosen. Then, one of the trajectory segments can be transformed to have a roughly correct relative pose with respect to another trajectory segment according to the relative transformation of the two poses of the chosen loop closure.

3) Establishing Connectivity of Potential Loop Closures:

Once the relative transformation between two trajectory segments are known and one trajectory segment is rotated to have correct relative pose with respect to the other, the next step is to construct connectivity of artificial loop closures. Dynamic Time Warping (DTW) (see for example M. Müller, "Dynamic time warping," Information retrieval for music and motion, pp. 69-84, 2007) is utilised to match poses of the two trajectories. Since DTW only allows associating trajectories traversed in the same direction, one trajectory segment would be reversed if the directions of two trajectory segments are different. All matches of poses between the two trajectory segments are the potential artificial loop closures, which, however, only contain connectivity without transformation and covariance information needed for a loop closure. The subsequent subsections focus on how to compute this information.

4) Formulating Model for Potential Artificial Loop Closures:

To calculate relative transformation, including translation and rotation, and corresponding covariance of each potential artificial loop closure, a graphical model is formulated as shown in FIG. 5.

$\hat{L}_0, \hat{L}_1, \ldots, \hat{L}_n$ are potential loop closures from the two trajectory segments T1 and T2. $\hat{L}_0$ is directly regarded as the initial artificial loop closure $\hat{L}_0$ and $\hat{L}_0$ is modelled as the observation of the last artificial loop closure $\hat{L}_n$.

In the upper part 510 of FIG. 5, there are two trajectory segments T1 104 and T2 106 which contain pose nodes (light and dark grey shaded circles) and odometry edges (solid black arrows). The selected loop closure and its consistent neighbour are $L_0$ and $L_n$ respectively (dashed vertical arrows). Since the connectivity of all the potential artificial loop closures are established in the last step, they are represented by $\hat{L}_0, \hat{L}_1, \ldots, \hat{L}_n$ (dash-dotted arrows) in the figure. Once the odometry information of the trajectory segments between any two loop closures is available, the distribution of one loop closure can be deduced from the distribution of the other one through probability propagation by dead reckoning. Therefore, by considering the selected loop closure $L_0$ as the initial loop closure and its consistent neighbour $L_n$ as the observation of the last loop closure $\hat{L}_n$, a loop closure chain 520 as shown in the bottom part of the figure can be obtained. Thus, in the embodiment being described, all loop closures, including artificial ones and two real ones, are modelled into nodes (black and white filled circles) in the model whose relative pose and covariance will be calculated next.

5) Calculating Relative Pose and Covariance:

The distribution of all the artificial loop closures can be calculated by dead reckoning where each loop closure rather than a pose is taken as the state variable. The probability is propagated from the initial loop closure through an Extended Rauch-Tung-Striebel (ERTS) smoother and the propagated mean and variance are constrained by the observation of the last artificial loop closures to avoid divergence. Note that all the artificial loop closure mentioned above are still potential ones.

Assume $\hat{L}_k \sim \aleph$ (k=0, 1, 2, . . . , n) are potential artificial loop closures where $\hat{x}_k$ and $\hat{S}_k^I$, are the state variable and covariance to be calculated, except for the initial one which is the same as the selected loop closure, i.e. $\hat{L}_0 = L_0 \sim \aleph$ ($l_0$, $S_0^I$), while $L_n \sim \aleph$ ($l_n$, $S_n^I$), which actually is the consistent neighbour, is regarded as an observation of the last potential artificial loop closure $\hat{L}_n$ in the model. Note that all $\hat{x}_k$, $x_0$ and $x_n$ are vectors indicating relative poses in the loop closures while $\hat{S}_k^I$, $S_0^I$ and $S_n^I$ are covariance matrices. Furthermore, the odometry edges of trajectory segments $T_1$ and $T_2$ between two potential artificial loop closures are represented by $o_i^{T_1} \sim \aleph$ ($u_i^{T_1}$, $Q_i^{T_1}$), (i=1, 2, . . . , $n_1$) and $o_j^{T_2} \sim \aleph$ ($u_j^{T_2}$, $Q_j^{T_2}$), (j=1, 2, . . . , $n_2$) respectively. Due to the DTW algorithm utilised in this embodiment, there will be no more than one odometry edge from each trajectory segment between one potential artificial loop closure and its successor. For brevity, only the case with two odometry edges between two loop closures is described herein; this is more complicated than the other cases, so the skilled person will be able to transfer the teachings accordingly without difficulty.

Since a standard ERTS smoother as mentioned in S. Särkkä, "Bayesian filtering and smoothing". Cambridge University Press, 2013, vol. 3 is applied in this embodiment, only the transition model and the observation model used in the smoother are addressed herein. The former solves the propagation from a potential artificial loop closure $\hat{L}_{k-1}$ to the successor $\hat{L}_k$ with odometry edges $o_i^{T_1}$ and $o_j^{T_2}$ as follows:

$$\hat{X}_k = g(\hat{X}_{k-1}, u_j^{T_2}, u_i^{T_1}) \quad (3a)$$
$$= M(\Delta\theta_i^{T_1})[f(f(0, \hat{X}_{k-1}), u_j^{T_2}) - f(0, u_i^{T_1})]$$

$$\hat{S}_k^I = J_{\hat{x}_{k-1}} S_{k-1}^I J_{\hat{x}_{k-1}}^T + J_{u_j^{T_2}} S_j^{T_2} J_{u_j^{T_2}}^T + J_{u_i^{T_1}} S_i^{T_1} J_{u_i^{T_1}}^T \quad (3b)$$

$$J_{\hat{x}_{k-1}} = \frac{\partial g}{\partial \hat{X}_{k-1}}, J_{u_j^{T_2}} = \frac{\partial g}{\partial u_j^{T_2}}, J_{u_i^{T_1}} = \frac{\partial g}{\partial u_i^{T_1}} \quad (3c)$$

where equation 3a is the transition from $\hat{L}_{k-1}$ to $\hat{L}_k$. Its nonlinearity is the reason why ERTS is chosen rather than RTS smoother. Matrix M is a rotation matrix and $\Delta\theta_i^{T_1}$ is orientation of $u_i^{T_1}$, representing the relative rotation in this odometry edge. f( ) is the device motion model and 0 is a zero vector. Equation 3b shows how to propagate the covariance matrix where J denotes the Jacobian matrix of function g( ) with respect to each input vector.

The above equations propagate distributions in the forward process when there is no observation of the potential artificial loop closure. For the last loop closure $L_n$ which has an observation $L_n$, the following observation model is used to execute an update step.

$$\hat{y}_n = H\hat{X}_n + r_n, r_n \sim \aleph(0, S_n^I) \quad (4)$$

where matrix H is a 3×3 identity matrix, it sums up the mean value of the last potential artificial loop closure $\hat{L}_n$ with a zero-mean Gaussian noise whose covariance function is the same as the one of its neighbour, the consistent neighbour loop closure $L_n$. Due to the linearity, the calculation of partial derivation is avoided for the observation model.

6) Choosing Potential Loop Closures to Inject:

Among all potential artificial loop closures, only a fixed percentage of them (e.g. 10%) that have the smallest uncertainties are injected into the graph 305 in the embodiment being described, producing an augmented pose graph 307 for back-ends 38. In other embodiments an amount other than 10% may be injected. For example roughly any of the following may be injected: 5%; 15% 20%, 25%.

III. Experimental Results

The embodiment being described was implemented in Matlab and tested on eight public datasets.

In terms of competing approaches, RRR [8] is considered as another middle layer, and back-ends (DCS [3], SC [1] and Cauchy robust kernel—[19] P. Agarwal, "Robust graph-based localization and mapping," PhD thesis, University of Freiburg, Germany, 2015), and open-source implementations are used. It is worth noting that further extensive experimental results can be found in a supplementary file at: https://github.com/xie9187/IROS2017-Supplementary-results.

A. Datasets

To fairly assess the approach disclosed herein and compare it with other approaches, eight different public datasets were used for experiments. Bicocca, Bovisa04 and Bovisa06 datasets are from reference [8]. Manhattan3500Olson (M3500Olson), ringCity, city10000 and intel datasets are available in the open source package of vertigo [2] (https://openslam.org/vertigo). MIT-Killian-Court (MIT) dataset is also open source (http://www.lucacarlone.com/index.php/resources/datasets).

The databases used are listed in Table I.

TABLE I

Public datasets used in experiments

| Dataset | Poses | Original loops | Max additional outliers |
|---|---|---|---|
| Bicocca | 43116 | 767 | 1534 |
| Bovisa04 | 11393 | 197 | 394 |
| Bovisa06 | 10744 | 219 | 483 |
| city10000 | 10000 | 10688 | 21376 |
| M3500Olson | 3500 | 2099 | 4198 |
| ringCity | 2361 | 901 | 1802 |
| Intel | 943 | 895 | 1790 |
| MIT | 808 | 20 | 40 |

In each dataset, varying numbers of additional outliers are randomly generated according to the number of original loop closures in the graph (25%, 50%, 100%, 200%). Thus for each dataset, four extra datasets are created with additional outliers. The relative pose in each outlier is sampled from a uniform distribution in Special Euclidean Group SE(2) while the information matrix is set to the average value of information matrices of original loop closures in a graph.

B. With and Without Middle Layer 310

In this section, the enhanced robustness of the whole system 300 when the embodiment being described is employed as a middle layer 310 between the front- 34 and back-ends 38 is validated.

Three robust back-end algorithms, Cauchy robust kernel (Cauchy) [19], DCS [3] and SC [1], implemented in g2o and vertigo are adopted to use in conjunction with the proposed middle layer 310. The performance of these back-ends 38 is compared when they are combined with/without the middle layer 310 on all datasets with a growing number of outliers. Although experiments have been performed on all datasets with several numbers of outliers, only results from M3500Olson, ringCity and MIT datasets with 50%, 100% and 200% outliers are illustrated in Table II and FIG. 6, for brevity.

compared to no middle-layer and an outlier-removal only middle layer:

Table II-A again shoes the root-mean-square error (RMSE) of optimised pose graphs. It can be seen that, when using the proposed outlier rejection (OR) algorithm alone, the system becomes more robust to false positive loop closures than systems without a middle layer. The Table shows that, when this embodiment of GTk is applied, the robustness of the system is further enhanced, generally increasing accuracy. Although there are few cases in which the error increases slightly when this embodiment is applied, improvements in the robustness of the whole system are generally seen, facilitating back-ends converging to correct results.

Further analysis of these experiments indicated that the optimisation result is improved by the outlier rejection (OR)

TABLE II

Results of different back-ends combined with/without RRR or GTk on 4 datasets

| Dataset | | ringCity | | | M3500Olsen | | | MIT-Killian-Court | | | Intel | |
|---|---|---|---|---|---|---|---|---|---|---|---|---|
| Back-end | | Cauchy | DCS | SC | Cauchy | DCS | SC | Cauchy | DCS | SC | Cauchy | DCS | SC |
| Outliers | Middle-end | | | | | | RMSE (m) | | | | | | |
| 50% | None | 15.79 | 0.78 | 1.39 | 23.90 | 5.84 | 0.32 | 12.66 | 155.63 | 59.90 | 0.05 | 0.07 | 0.13 |
| | RRR | 26.76 | 19.74 | 15.85 | 23.65 | 12.52 | 12.60 | 135.65 | 157.54 | 122.57 | 0.10 | 0.10 | 3.28 |
| | GTk | 1.05 | 0.59 | 1.41 | 1.05 | 0.59 | 1.41 | 1.91 | 156.29 | 2.00 | 0.06 | 0.07 | 0.10 |
| 100% | None | 34.84 | 4.75 | 10.26 | 24.40 | 6.91 | 0.12 | 16.86 | 155.40 | 118.59 | 0.06 | 0.07 | 0.10 |
| | RRR | 42.67 | 19.33 | 18.15 | 29.47 | 5.21 | 5.44 | 11.25 | 156.05 | 34.63 | 0.10 | 0.10 | 0.17 |
| | GTk | 3.53 | 0.80 | 1.00 | 24.75 | 0.44 | 0.34 | 1.54 | 154.13 | 8.55 | 0.06 | 0.06 | 0.09 |
| 200% | None | 67.36 | 13.06 | 36.04 | 25.36 | 7.52 | 0.04 | 55.43 | 155.92 | 150.55 | 0.10 | 0.07 | 0.09 |
| | RRR | 31.41 | 25.74 | 26.16 | 12.92 | 14.37 | 13.65 | 44.23 | 155.27 | 35.61 | 0.10 | 0.10 | 8.30 |
| | GTk | 13.59 | 2.65 | 4.44 | 23.99 | 5.72 | 0.28 | 37.55 | 157.34 | 68.30 | 0.09 | 0.10 | 0.10 |

As shown in Table II, which lists root-mean-square errors (RMSE) for optimised pose graphs, the embodiment being described (GTk) is capable of improving, perhaps significantly, the robustness of the three robust back-ends. Although there are few cases in which the RMSE increases slightly when the embodiment being described (GTk) is applied, improvements in the robustness of the whole system 300 are generally seen, enabling back-ends 38 to converge to correct results. Moreover, RRR, applied as another middle layer, is also mentioned in this table and will be discussed more in the next subsection.

Table II-A, below, shows equivalent data for a slightly different embodiment of GTk, algorithm because it effectively removes most of the false-positive loop closures. However, since a number of true-positives are also rejected, the graph loses some essential constraints, and does not converge globally to the ground-truth. By contrast, when an embodiment including the further step of the GTk embodiment being described of inserting artificial loop closures is applied, these discarded constraints are artificially constructed by the inlier injection algorithm, which enables the back-end to converge to an accurate reconstruction. In general, it can be seen that the combination of outlier rejection and inlier insertion together can make existing SLAM approaches more robust, without extensive parameter tuning.

TABLE II-A

Results of different back-ends combined no middle layer, Outlier Rejection (OR) only or GTk (outlier rejection and inlier insertion) on 4 datasets

| Dataset | | ringCity | | | M3500Olsen | | | Intel | | | MIT-Killian-Court | | |
|---|---|---|---|---|---|---|---|---|---|---|---|---|---|
| Back-end | | Cauchy | DCS | SC | Cauchy | DCS | SC | Cauchy | DCS | SC | Cauchy | DCS | SC |
| Outliers | Middle-end | | | | | | RMSE (m) | | | | | | |
| 50% | None | 10.88 | 0.72 | 0.66 | 23.87 | 9.11 | 0.27 | 0.04 | 0.06 | 0.12 | 12.61 | 16.37 | 13.71 |
| | OR | 0.95 | 0.48 | 1.12 | 1.98 | 0.23 | 0.37 | 0.05 | 0.06 | 0.06 | 1.87 | 9.78 | 1.84 |
| | GTk | 0.68 | 0.83 | 1.12 | 0.19 | 0.09 | 0.09 | 0.07 | 0.06 | 0.06 | 1.90 | 2.28 | 2.09 |
| 100% | None | 31.03 | 4.78 | 5.23 | 24.60 | 8.15 | 0.01 | 0.05 | 0.06 | 0.08 | 16.87 | 52.51 | 19.99 |
| | OR | 2.25 | 0.66 | 0.70 | 16.87 | 0.12 | 0.13 | 0.05 | 0.06 | 0.06 | 2.32 | 13.61 | 8.25 |
| | GTk | 1.82 | 0.68 | 0.63 | 6.68 | 0.07 | 0.08 | 0.07 | 0.06 | 0.06 | 1.27 | 10.61 | 8.25 |
| 200% | None | 51.63 | 13.42 | 23.42 | 25.43 | 8.03 | 0.02 | 0.09 | 0.06 | 0.20 | 53.18 | 58.22 | 127.14 |
| | OR | 3.74 | 0.64 | 22.21 | 23.48 | 2.75 | 0.25 | 0.06 | 0.06 | 0.06 | 36.22 | 72.46 | 64.14 |
| | GTk | 1.44 | 1.08 | 0.91 | 16.35 | 0.20 | 0.20 | 0.07 | 0.06 | 0.06 | 36.25 | 26.04 | 64.11 |

For the MIT-Killian-Court dataset, the benefit of incorporating the embodiment being described (GTk) only comes when used with Cauchy and SC because DCS fails even when there are no additional outliers where the parameter Φ is tuned from 0.1 to 10. Thus, the embodiment being described (GTk) cannot improve the DCS back-end on this dataset. While for the Intel Research dataset, since its initialisation of pose nodes is already close to ground truth, it is easy for all approaches to reach a satisfactory result after optimisation with any number of outliers.

In ringCity and M3500Olson datasets, dramatic improvements are achieved by the embodiment being described (GTk), RMSE is reduced by several times, except for applying SC on M3500Olson dataset which does not fail with any number of outliers.

FIGS. 6A-F show a few example results of different back-ends with/without the embodiment being described (GTk) tested on three datasets with 100% additional outliers.

The solid line 602a-f shows the ground truth. The dotted line 604a-f shows the calculation using the combination of GTk/no-GTk with a back end.

Figure 6A:
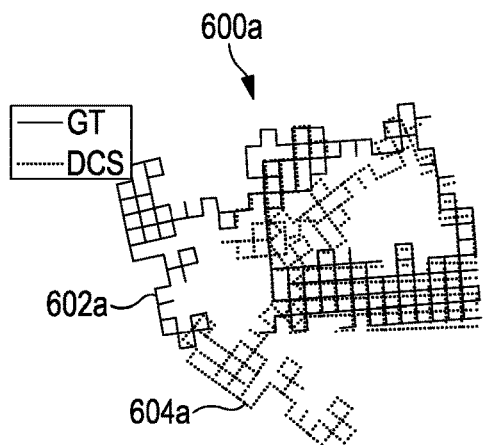
FIGS. 6A-6F show example results comparing prior art method performance to performance of a method of an embodiment of the invention, with different back-ends.
Figure 6B:
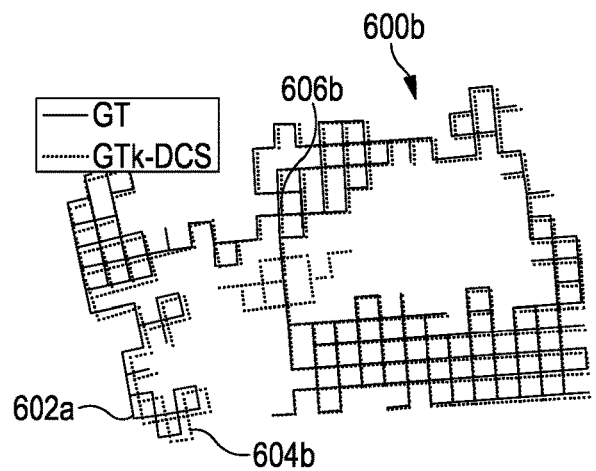

FIG. 6A shows a plot 600a of ground truth 602a (the Manhattan3500Olson dataset) compared to a DCS back-end 38 used without a middle layer 310 of the embodiment being described. FIG. 6B shows a plot 600b of the same ground truth 602a compared to the DCS back-end 38 used with a middle layer 310 of the embodiment being described. It can be seen that the model matches the ground truth much more closely when the middle layer 310 is used.

Figure 6C:
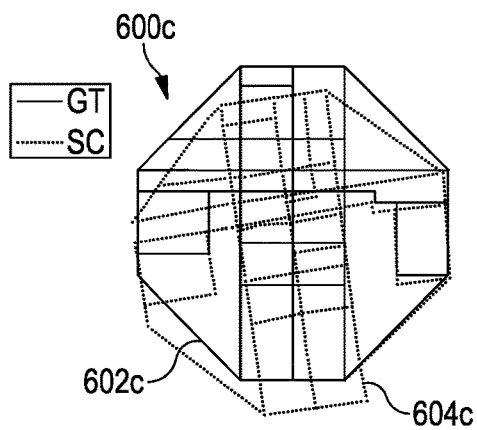
Figure 6D:
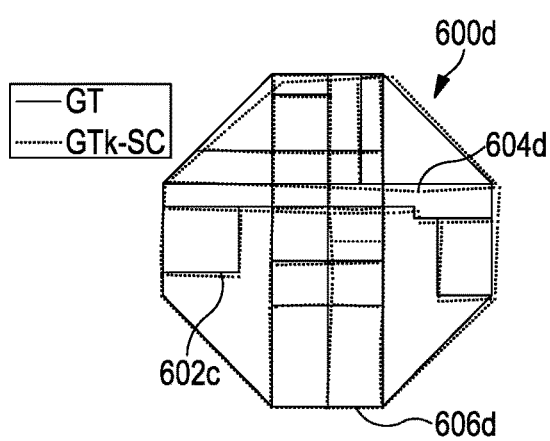

FIG. 6C shows a plot 600c of ground truth 602c (the ringCity dataset) compared to a SC back-end 38 used without a middle layer 310. FIG. 6D shows a plot 600d of the same ground truth 602c compared to the SC back-end 38 used with a middle layer 310. It can be seen that the model matches the ground truth much more closely when the middle layer 310 is used.

Figure 6E:
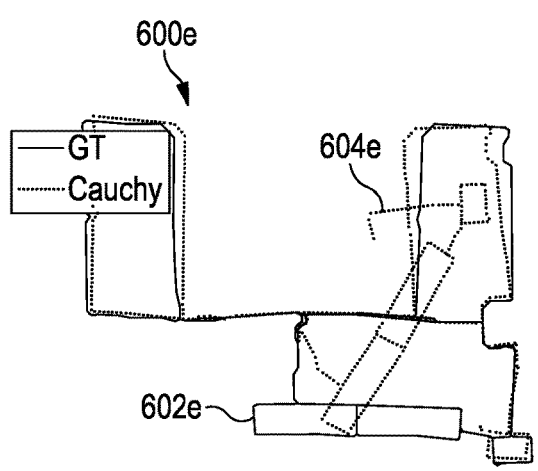
Figure 6F:
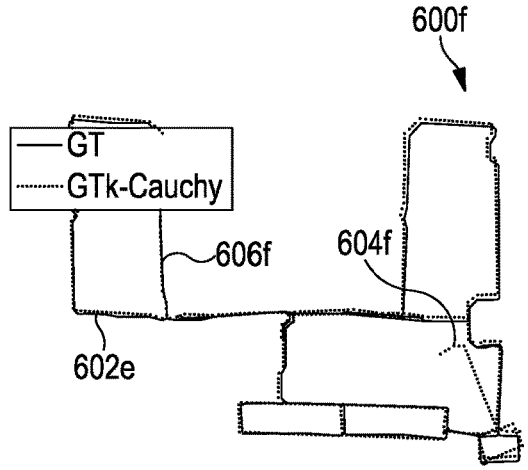

FIG. 6E shows a plot 600e of ground truth 602e (the MIT-Killian-Court dataset) compared to a Cauchy robust kernel back-end 38 used without a middle layer 310. FIG. 6F shows a plot 600f of the same ground truth 602e compared to the Cauchy robust kernel back-end 38 used with a middle layer 310. It can be seen that the model matches the ground truth much more closely when the middle layer 310 is used.

FIG. 9 illustrates the influence of different middle layers, using the Mahattan3500Olson (FIGS. 9A-9C) and ringCity (FIGS. 9D-9F) datasets. It can be seen that the optimisation result is largely improved by the outlier rejection (OR) embodiment because it effectively removes most of the false-positive loop closures. The results show the output of different middle layers on two datasets with 200% additional outliers. The impact of the outlier rejection (OR) embodiment and the entire GraphTinker (GTk) embodiment are shown compared to a prior art approach with no middle layer. The red (darker grey) trace (902a, 902d) shows the ground truth. This remains the same for each Figure within each set of three (i.e. one ground truth 902a for FIGS. 9A-9C and a second ground truth 902d for FIGS. 9D-9F). The green (lighter grey) traces show the calculated model.

Figure 9A:
FIGS. 9A-9F show example results comparing prior art method performance to performance of methods of two embodiments of the invention (outlier removal, and outlier removal and artificial loop closure insertion), with different back-ends.
Figure 9D:
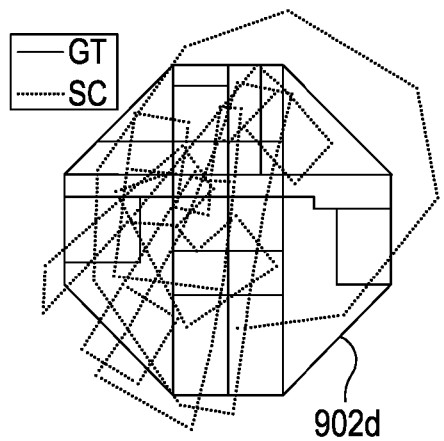
Figure 9B:
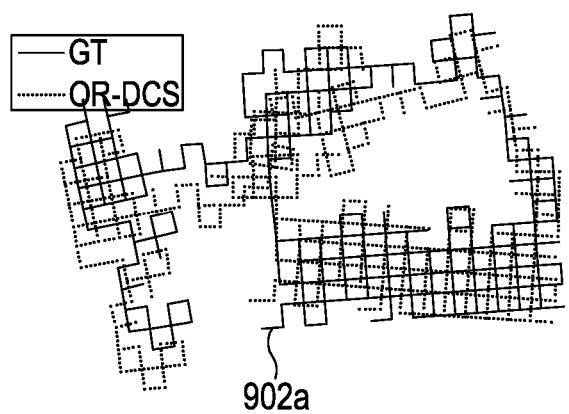
Figure 9E:
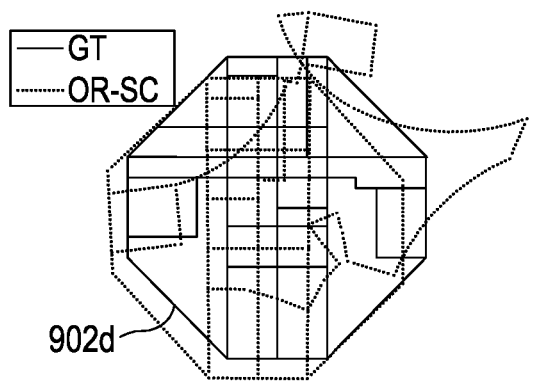
Figure 9C:
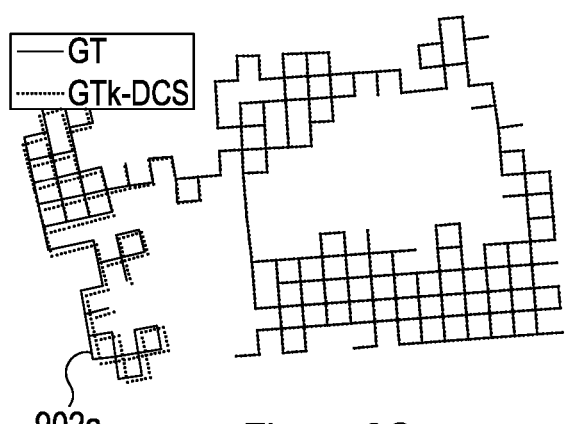

FIGS. 9A to 9C show results of DCS (no middle layer), OR-DCS and GTk-DCS respectively on the Manhattan3500Olson dataset; i.e. all three figures use the Dynamic Covariance Scaling (DCS) back-end, just with different (or absent) middle layers.

Figure 9F:
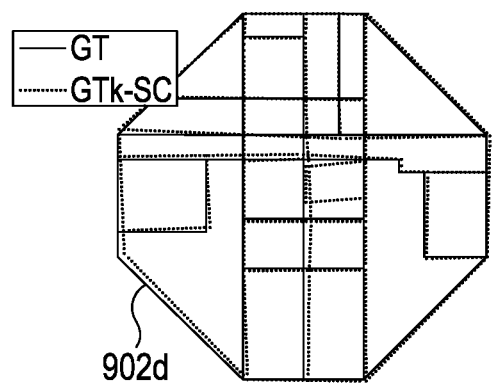

FIGS. 9D to 9F show results of SC (no middle layer), OR-SC and GTk-SC on ringCity dataset; i.e. again, this set of three figures uses the same back end for each, namely a Switchable Constraints back end as discussed above.

For more results, please refer to the supplementary file referenced above.

The skilled person will appreciate that, whilst the datasets shown relate to x-y coordinates of a global map, the approach discussed herein can be used in any context in which loop closures exist whether or not there is a global map. For example, it may be used in Experience-Based Navigation type situations, as discussed in WO2013117940, "METHOD OF LOCATING A SENSOR AND RELATED APPARATUS".

C. Comparison with RRR

For existing robust graph SLAM algorithms and back-ends 38, RRR is the most similar to the embodiment being described with open-source resources. Therefore, it is chosen as a comparison.

FIGS. 2A-D illustrate results using the Realizing, Reversing, Recovering (RRR) algorithm [8] discussed earlier and the middle layer of the embodiment described for pose graph SLAM. Solid lines 202a, 202c show ground truth (GT). Dotted lines 204a-d show the model.

Figure 2A:
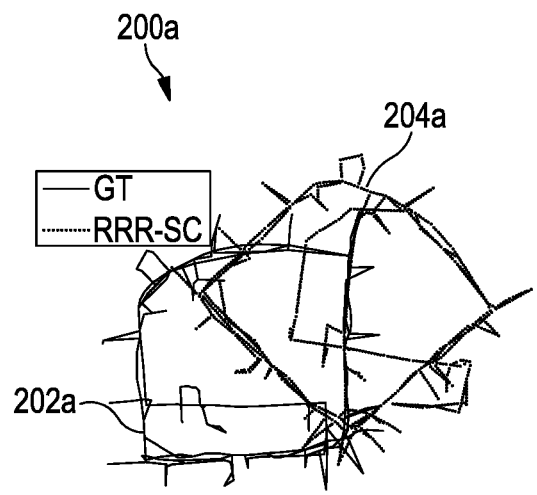
FIGS. 2A and 2B show SLAM results, comparing Ground Truth to the calculated positions, using a prior art method and an embodiment of the method disclosed herein, respectively, using a Switchable Constraints back-end.
Figure 2B:
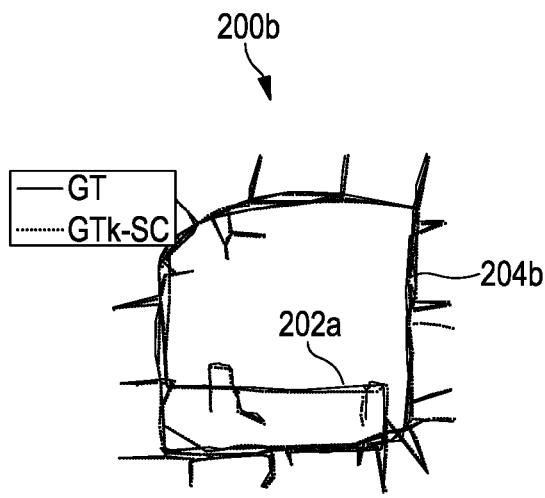

FIGS. 2A and 2B show results on the Intel Research dataset with 1790 (200%) additional outliers based on Switchable Constraints (SC) [2] backend, with plot 200a showing the use of RRR and plot 200b showing the use of the middle layer 310 in place of RRR, with the same back-end 38.

Figure 2C:
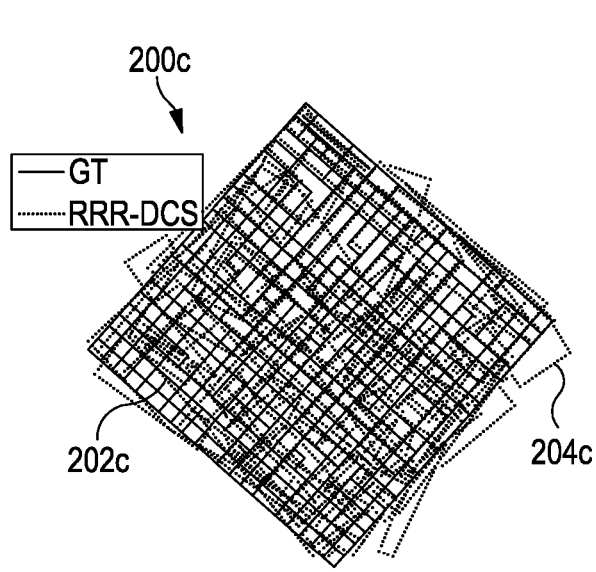
FIGS. 2C and 2D show SLAM results, comparing Ground Truth to the calculated positions, using a prior art method and an embodiment of the method disclosed herein, respectively, using a Dynamic Covariance Scaling back-end.
Figure 2D:
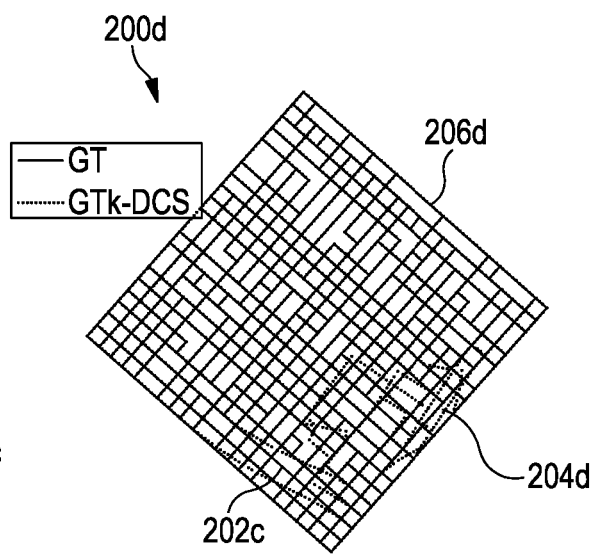

FIGS. 2C and 2D show results on the city10000 dataset with 21376 (200%) extra false-positive loop closures based on Dynamic Covariance Scaling (DCS) [3] back-end 38, with plot 200c showing the use of RRR and plot 200d showing the use of the middle layer 310 in place of RRR, with the same back-end 38.

The combinations of RRR and the middle layer 310 with DCS and SC back-ends 38 were tested with all datasets.

Some of the results are shown in Table II (above), FIG. 7 and FIG. 8. It is worth noting that the default parameter values were used in both RRR and the middle layer 310 in all the experiments as it is thought that a robust middle layer should not rely on manually tuned parameters.

FIG. 7A-D shows a comparison between applying RRR and the middle layer 310 on several datasets, combined with two different robust back-ends 38 (DCS and SC). In each dataset, a growing percentage of additional random false-positives are generated (0%, 25%, 50%, 100% and 200%, as indicated on the x axis).

Figure 7A:
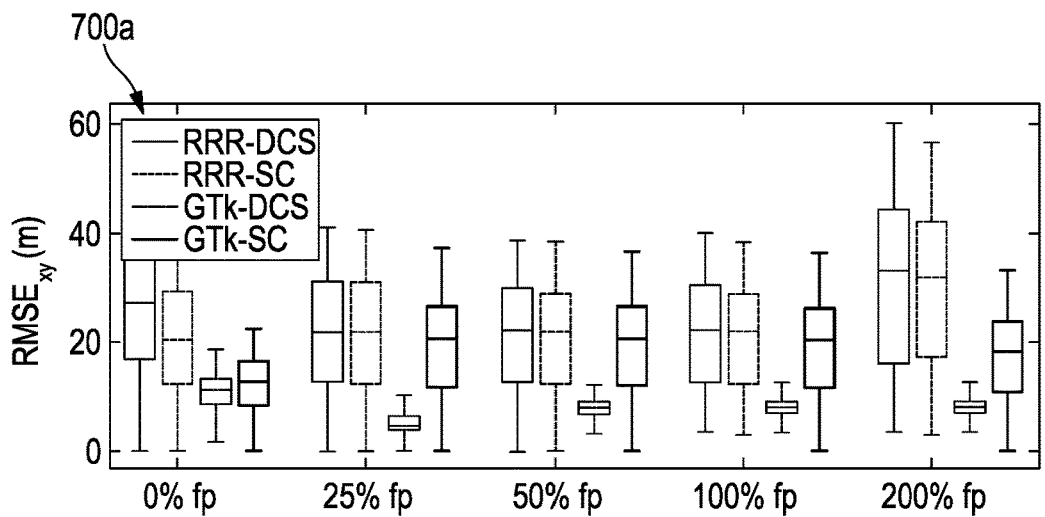
FIGS. 7A-7C show example results comparing prior art method performance to performance of a method of an embodiment of the invention, with different back-ends.
Figure 7B:
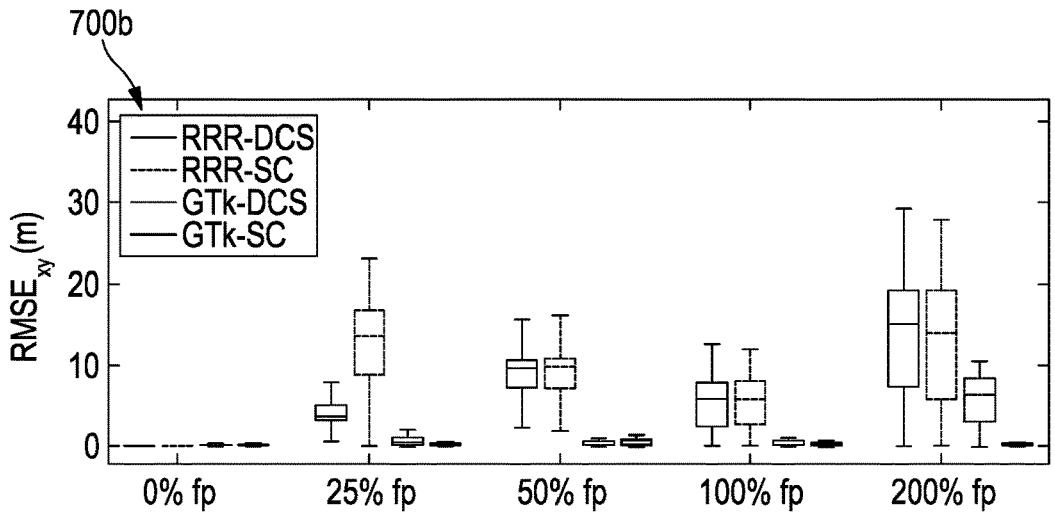
Figure 7C:
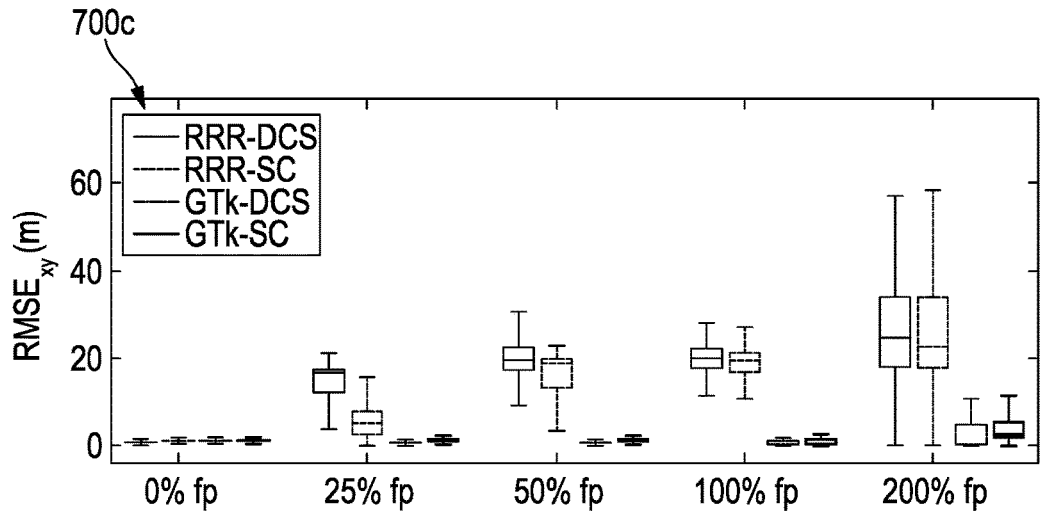

FIG. 7A-C illustrate the RMSE of the results. Each subgraph (700a, 700b, 700c) represents the experiments on a dataset where the x axis indicates the ratio between the number of additional false-positives and original loop closures.

Red and blue boxes (first two, i.e. leftmost two, in each cluster) represent results from RRR while green and orange boxes (last two, i.e. rightmost two, in each cluster) are for a middle layer 310 of the embodiment being described.

In each set of box-plots in each graph 700a-c, the box plot for RRR-DCS is left-most, adjacent to the box plot for RRR-SC. The box plot for the middle layer 310-SC is right-most, adjacent to the box plot for the middle layer 310-DCS.

In FIG. 7A, it can be seen that although middle layer 310 tends to have a worse performance when combined with SC, the RMSE is extensively reduced when DCS is applied as the robust back-end on the Bovisa04 dataset (FIG. 7A).

In all these cases, the middle layer 310 outperforms RRR, especially on the M3500Olson (FIG. 7B) and ringCity (FIG. 7C) datasets.

For more detailed results and comparison with RRR, please refer to the supplementary file referenced above.

FIG. 8A-F illustrates some results on three datasets for the comparison of utilising RRR or the middle layer 310, combined with DCS and SC as robust back-ends 38.

The solid lines 802*a-e* are the ground truth. The dotted lines 804*a-f* are the model.

Figure 8A:
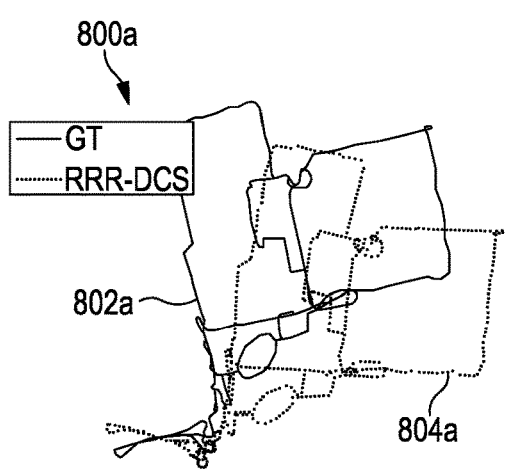
FIGS. 8A-8F show example results comparing prior art method performance to performance of a method of an embodiment of the invention, with different back-ends.
Figure 8B:
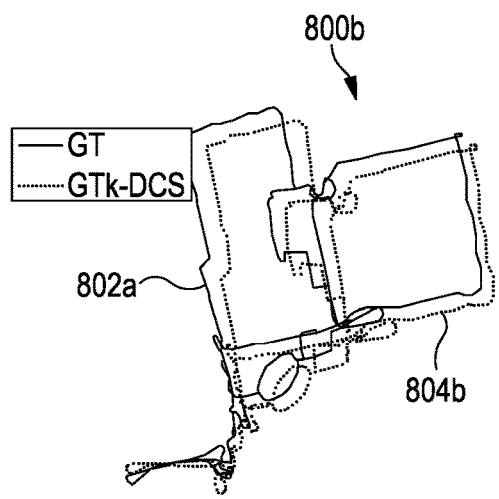

FIGS. 8A and 8B show RRR and the middle layer 310 (plots 800*a* and 800*b*, respectively) results on Bovisa04 datasets with 200% outliers with DCS as back-end 38.

Figure 8C:
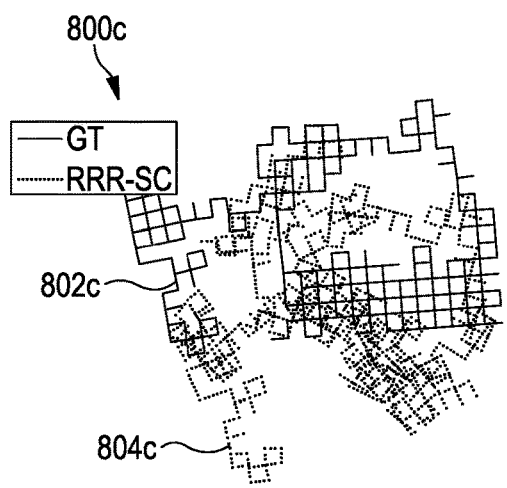
Figure 8D:
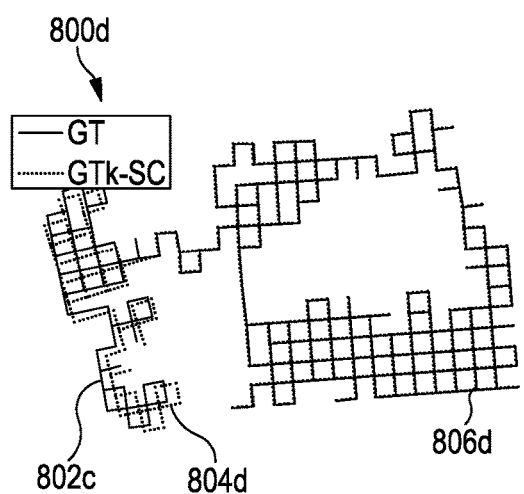

FIGS. 8C and 8D show RRR and the middle layer 310 (plots 800*c* and 800*d*, respectively) results on M3500Olson dataset with 200% extra false-positives with SC as back-end 38.

Figure 8E:
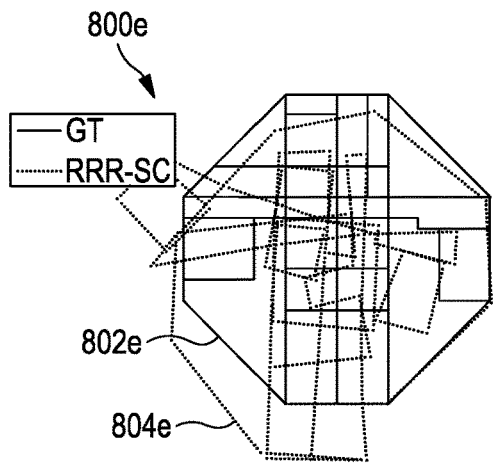
Figure 8F:
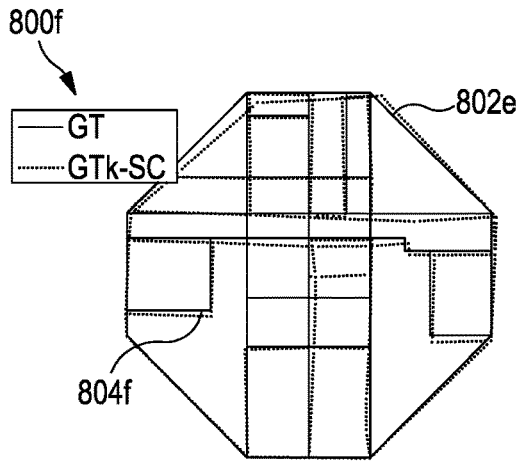

FIGS. 8E and 8F show RRR and the middle layer 310 results (plots 800*c* and 800*d*, respectively) on MIT-Killian-Court dataset with 100% additional outliers with SC as back-end 38.

In each pair, the ground truth line 802 is the same.

D. Runtime Analysis

Although the middle layer 310 was implemented with Matlab rather than C or C++ in the embodiment being described, the runtime was found to be reasonable. The skilled person would appreciate that the middle layer 310, or other implementation, may be implemented in any appropriate language.

The detailed runtime of middle layer 310 on the eight datasets is given in Table III.

TABLE III

Runtime of GTk on 8 datasets

| Dataset | Number of loop closures | Running time (s) |
| --- | --- | --- |
| Bicocca | 767 | 14.18 |
| Bovisa04 | 197 | 3.22 |
| Bovisa06 | 219 | 7.34 |
| city10000 | 10688 | 809.69 |
| M3500Olson | 2099 | 315.06 |
| ringCity | 901 | 88.18 |
| Intel | 895 | 311.39 |
| MIT | 20 | 0.25 |

The most time consuming part in the embodiment being described was found to be executing abundant spatial consistency tests while looking for a consistent subset of loop closures in the graph.

The quadratic time increase with respect to the number of loop closures is avoided in this embodiment by restricting the traversing distance of the circle in the test with a threshold which largely reduces the number of loop closures to be compared. Hence, this threshold determines runtime to some extent. However, an extremely small threshold will prevent the selected loop closure from being compared with enough other loop closures. Hence, the default value is set to 300 steps in the embodiment being described to achieve a suitable balance between runtime and performance. In the embodiment being described, each step is an actual step taken by a person carrying the device; one step corresponds to one odometry edge in this embodiment. In alternative embodiments, a "step" may correspond to a set number of steps or wheel rotations, a set distance, a set time of travel, a time between pauses, or the like.

Figure 10:
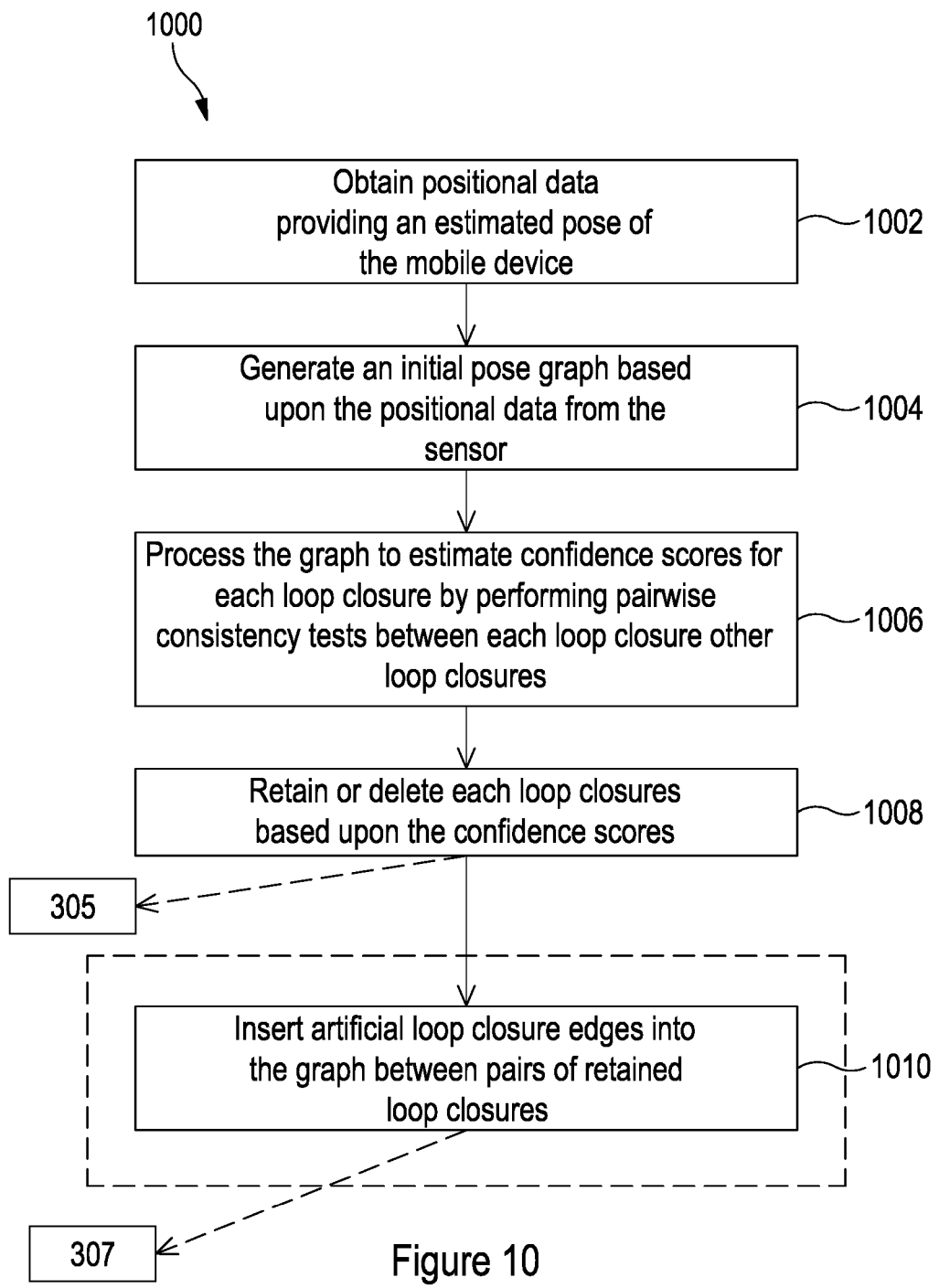
FIG. 10 illustrates a method of embodiments of the invention.

FIG. 10 summarises the method 1000 of embodiments of the invention. Pose data is obtained at step 1002, and a graph is generated from that data at step 1004. The graph is processed to estimate confidence scores for each loop closure by performing pairwise consistency tests between each loop closure other loop closures at point 1006. Loop closures are then deleted if the confidence in their accuracy is too low (e.g. a confidence score below a first threshold/level, or a centre value of the k-means clustered group lower than for the other k-means clustered group), or otherwise retained in the graph, at step 1008. A consistent graph 305 is the output from step 1008, as the inconsistent loop closures (outliers) should have been removed and only consistent loop closures retained.

Step 1010, artificial loop closure insertion, is performed in embodiments implementing the "GTk" approach discussed above in addition to the Outlier Removal (OR) approach common to all embodiments, but not in all embodiments. The output from step 1010 is the augmented graph 307 shown in FIG. 3B.

Figure 11:
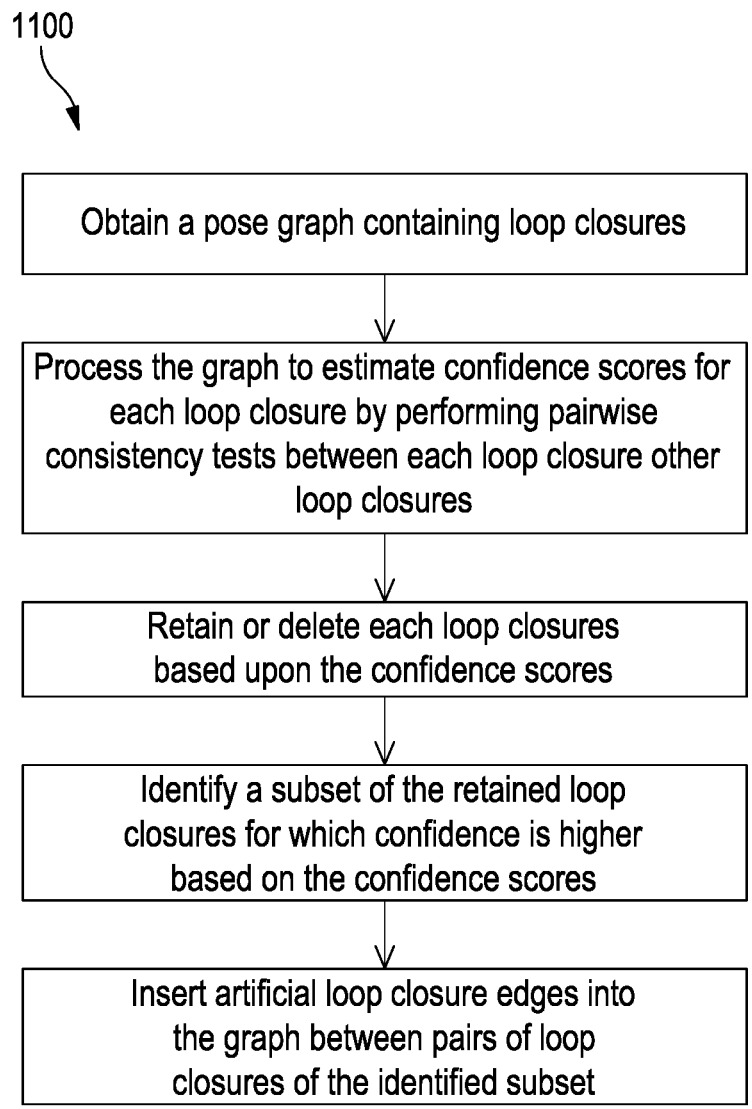
FIG. 11 illustrates a method of embodiments of the invention.

FIG. 11 summarises the method 1100 of embodiments of the invention which include artificial loop closures (i.e. the GTk approach), and in which only a subset of the retained loop closures are used to generate the artificial loop closures. Loop closures may be selected for generation of the artificial loop closures if the confidence in their accuracy is high enough (e.g. above a second threshold/level higher than the first, or a value above the centre value for the inlier k-means clustered group). The skilled person will appreciate that confidence scores can be calculated in many different ways, and that lower confidence scores may indicate higher confidence in some embodiments.

From the above, the skilled person will appreciate that embodiments/aspects of the invention may be thought of as providing one or more of the following:

- A spatial consistency testing algorithm to measure the consistency between a pair of loop closures (for example between a first and subsequent loop closures) and select a subset of consistent ones, removing false positive loop closures even if they form an overwhelming majority of identified loop closures;
- An approach is developed to boost the robustness of pose graph SLAM by automatically reconstructing and injecting trustworthy artificial loop closures in the framework of an Extended Rauch-Tung-Striebel smoother;
- A universal middle layer, named Graph-Tinker (GTk), is constructed from the above two approaches, which may be used in conjunction with any front-end and back-end systems to improve their performance.

Uses of embodiments described herein could include, but are not limited to, any of the following examples:

(i) allowing a device to localise itself with respect to trajectories of other devices; for example a firefighter with a smart device (e.g. smartphone, smart watch, part of a firefighter's standard kit, or the like) arranged to implement an embodiment of the invention can localise him or herself, on entering a building, relative to the trajectories of other firefighters that have already walked inside the building;

(ii) creating maps of traffic or foot-fall, for example for use in retail surveys to establish where customers walk and look;

(iii) creating maps of environments through which devices have travelled.

The skilled person will appreciate that the embodiments disclosed herein could be used for SLAM of one device's trajectories, or of trajectories of multiple devices. Further, trajectories used by a single embodiment may be a mixture of trajectories generated by different types of devices, such as some being generated by robots, some by other mobile objects and some by people.

The invention claimed is:

1. A computer-implemented method of constructing a model of the motion of a mobile device, wherein the method comprises:
   using a sensor of the device to obtain positional data providing an estimated pose of the mobile device;
   generating an initial graph based upon the positional data from the sensor, nodes of which graph provide a series of possible poses of the device, and edges of which graph represent odometry and/or loop closure constraints;
   processing the graph to estimate confidence scores for each loop closure by performing pairwise consistency tests between each loop closure and a set of other loop closures; and
   generating an augmented graph from the initial graph by:
      retaining or deleting each loop closure based upon the confidence scores, and
      inserting artificial loop closure edges into the graph between pairs of retained loop closures.

2. A method according to claim 1 in which the artificial loop closures are created by selecting one or more pairs of nodes of the graph and calculating an edge to link the pair of nodes, each new edge representing a new loop closure.

3. A method according to claim 2 in which the artificial edges are calculated by determining a transformation that transforms the pose of a first node of the pair to a pose of second node of the pair.

4. A method according to claim 1 in which the consistency checks performed between pairs of nodes are spatial consistency checks.

5. A method according to claim 1 in which the estimated pose of the mobile device is determined relative to the initial pose of the device.

6. A method according to claim 1, in which the loop closure is deleted from the graph if its confidence score is below a first level and retained if the confidence score is above the first level, and wherein optionally the first level is fixed or learned.

7. A method according to claim 1, in which the loop closures are clustered into two groups using k-means clustering, and the loop closures in the group with the lower centre value are deleted from the graph.

8. A method according to claim 7 in which the loop closure is retained if it is in the group with the higher centre value.

9. A method according to claim 1 in which a pair of loop closures is used to seed the generation of artificial loop closures if the confidence scores are above a second level, and wherein optionally the second level may be fixed or learnt from the data.

10. The method of claim 1, in which the loop closures are clustered into two groups using k-means clustering, and the loop closures in the group with the lower centre value are deleted from the graph, wherein which a pair of loop closures is used to seed the generation of artificial loop closures if the confidence scores are above a second level, and wherein optionally the second level may be fixed or learnt from the data and the second level is the centre value of the group with the higher centre value.

11. A method according to claim 1 further comprising using the augmented graph to generate a model of the internals of a building.

12. A method according to claim 1 further comprising using the augmented graph to allow a first device of one or more mobile devices to localise itself with respect to the trajectories of the other mobile devices.

13. A method according to claim 1 in which the device is arranged to be carried by a person, robot, or vehicle or to be a part of, a vehicle or robot able to move itself.

14. A machine-readable medium containing instructions which, when read by a processor, cause that processor to implement a method of constructing a model of the motion of a mobile device, wherein the method comprises:
   using a sensor of the device to obtain positional data providing an estimated pose of the mobile device;
   generating an initial graph based upon the positional data from the sensor, nodes of which graph provide a series of possible poses of the device, and edges of which graph represent odometry and/or loop closure constraints;
   processing the graph to estimate confidence scores for each loop closure by performing pairwise consistency tests between each loop closure and a set of other loop closures; and
   generating an augmented graph from the initial graph by:
      retaining or deleting each loop closure based upon the confidence scores, and
      inserting artificial loop closure edges into the graph between pairs of retained loop closures.

15. A system comprising a processor arranged to perform the following steps:
   obtain an initial graph based upon positional data from a sensor of a mobile device, nodes of which graph provide a series of possible poses of the device, and edges of which graph represent odometry and/or loop closure constraints;
   process the graph to estimate confidence scores for each loop closure by performing pairwise consistency tests between each loop closure and a set of other loop closures; and
   generate an augmented graph from the initial graph by retaining or deleting each loop closure based upon the confidence scores, and
   inserting artificial loop closure edges into the graph between pairs of retained loop closures.

16. The system of claim 15, wherein the processor is further arranged to insert artificial loop closures into the graph between pairs of retained loop closures.

17. The system of claim 16, wherein the processor is further arranged to identify a subset of the retained loop closures based on the confidence scores, and to use only loop closures in the subset of the retained loop closures to seed artificial loop closures.

18. The system of claim 15, further comprising:
   the mobile device, wherein the mobile device comprises, or has mounted thereon, the sensor which is arranged to provide the positional data, and the mobile device is a mobile telephone, smart watch, inertial measurement unit (IMU), or smart camera.

19. The system of claim 15, wherein the system is provided by the mobile device, wherein the mobile device comprises, or has mounted thereon, the sensor which is arranged to provide the positional data and the processor.

* * * * *